FIG. 28.

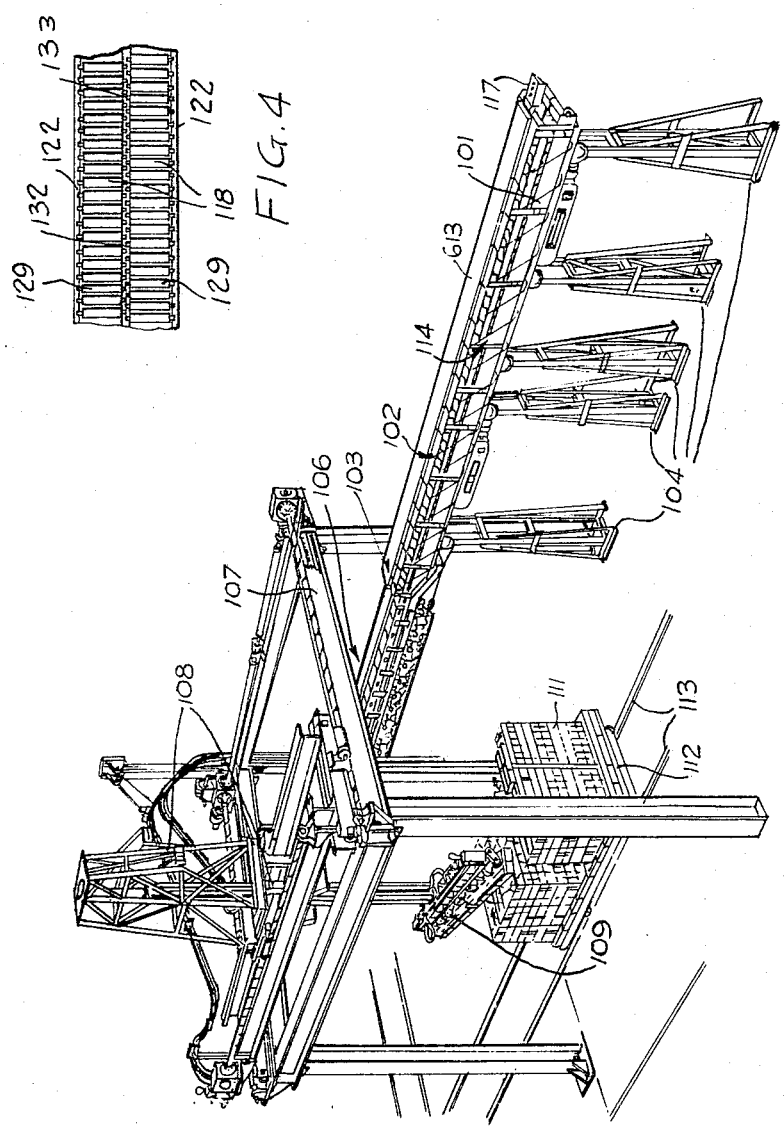

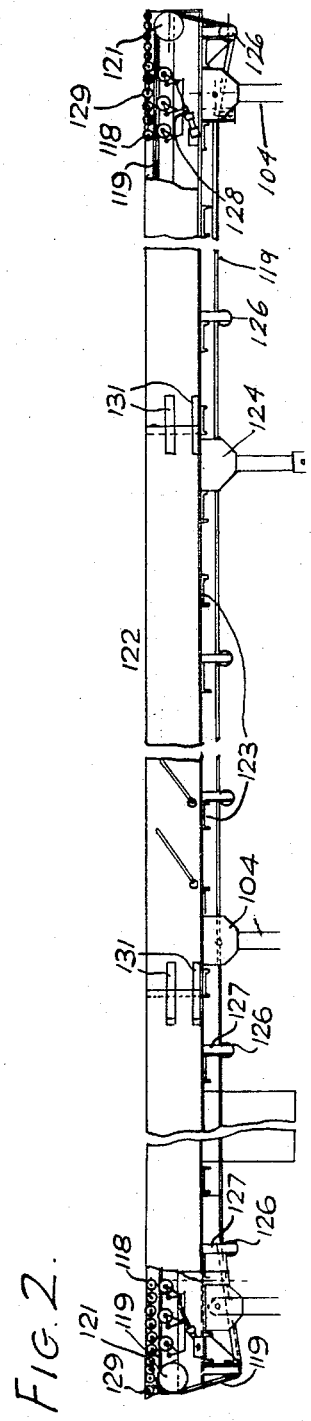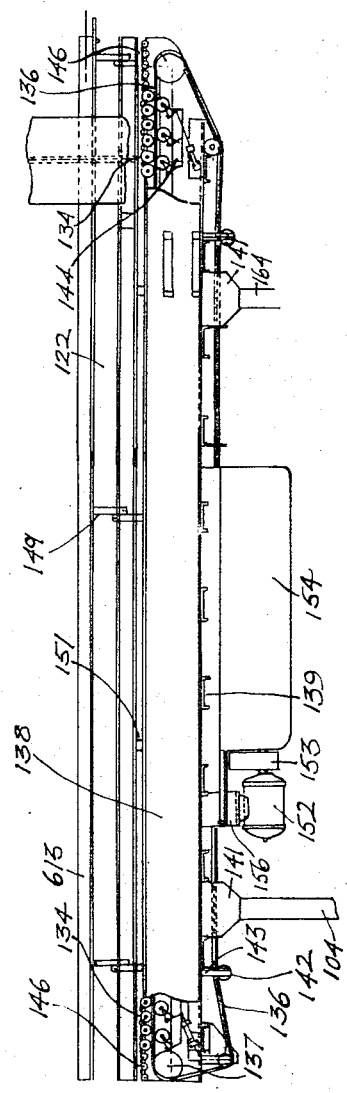

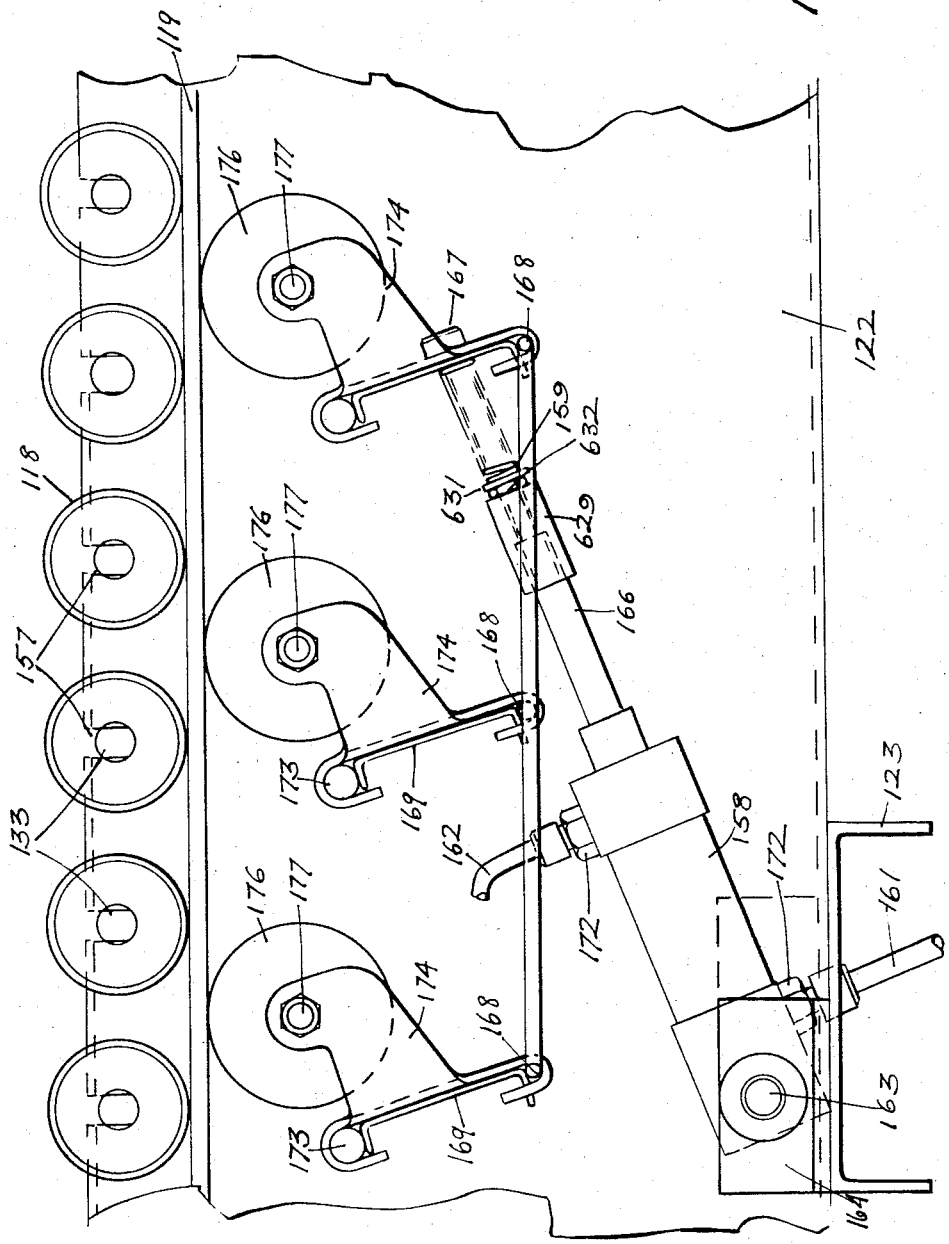

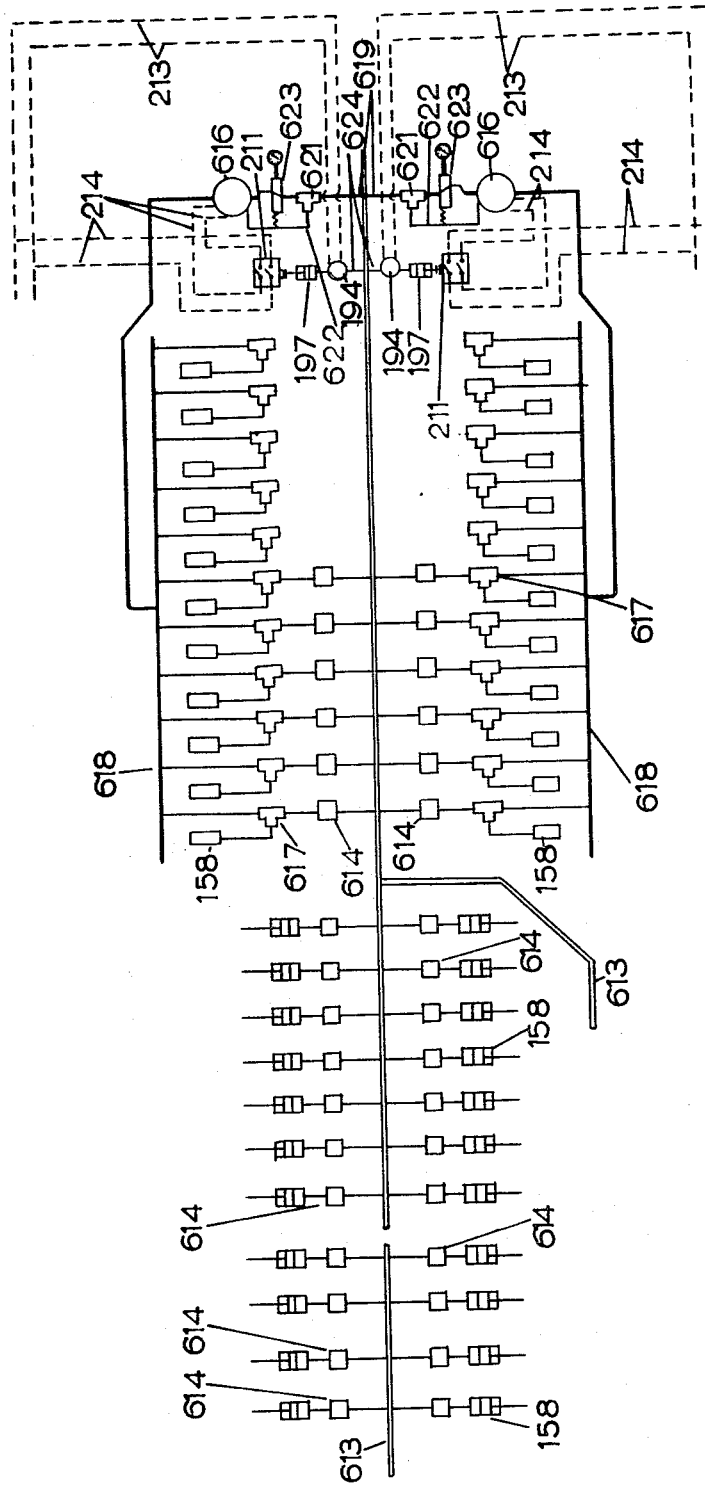

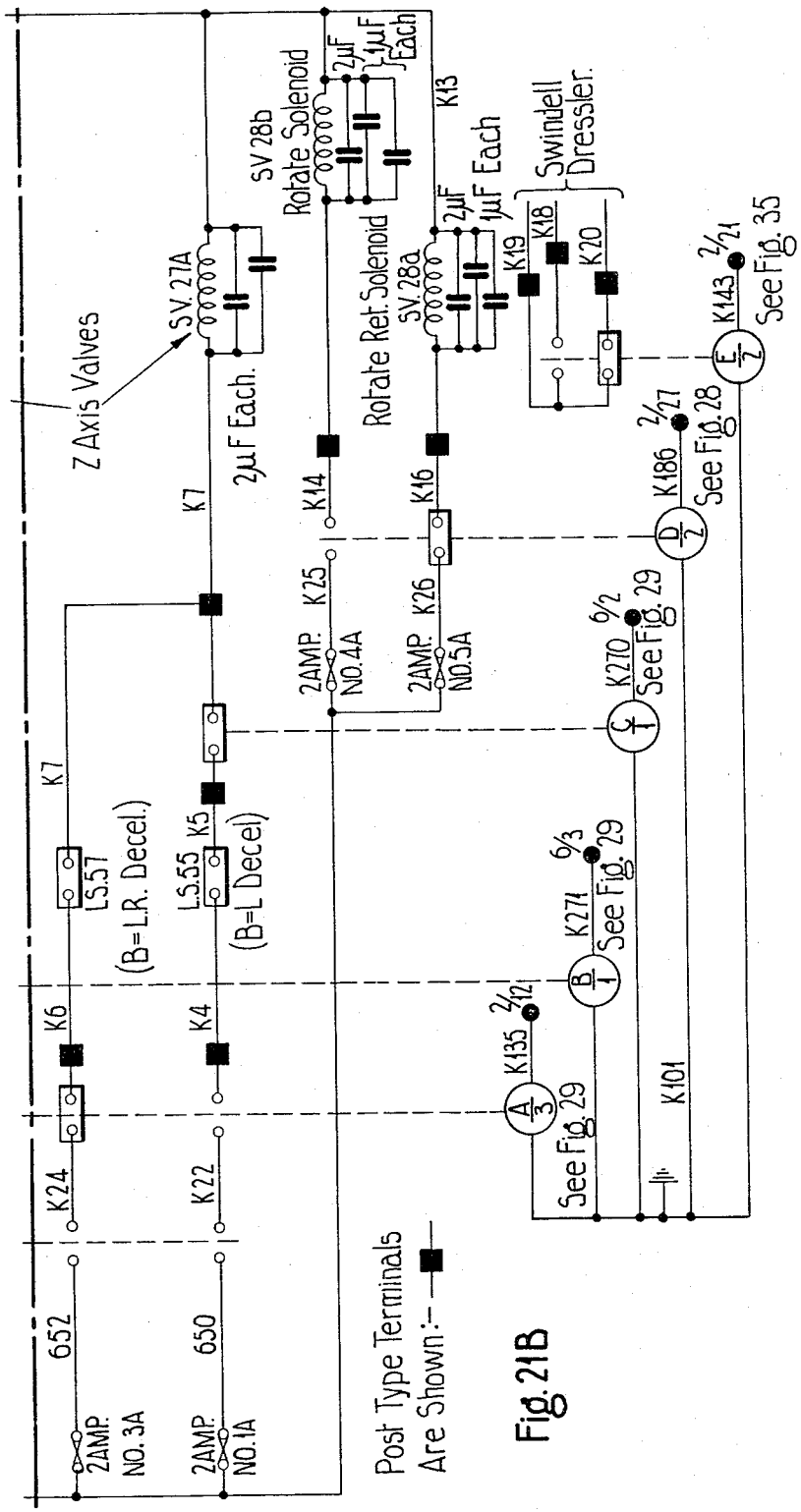

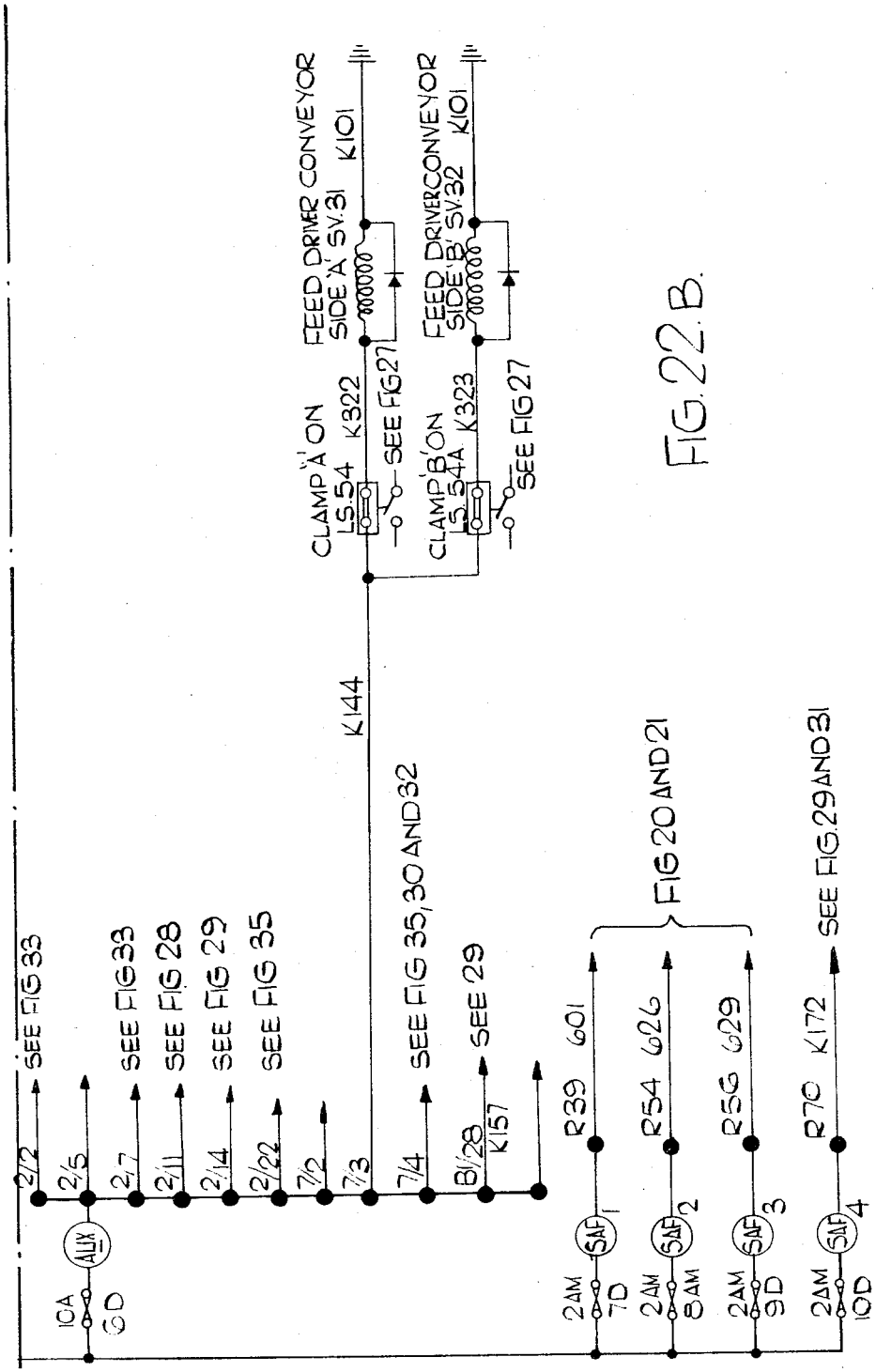

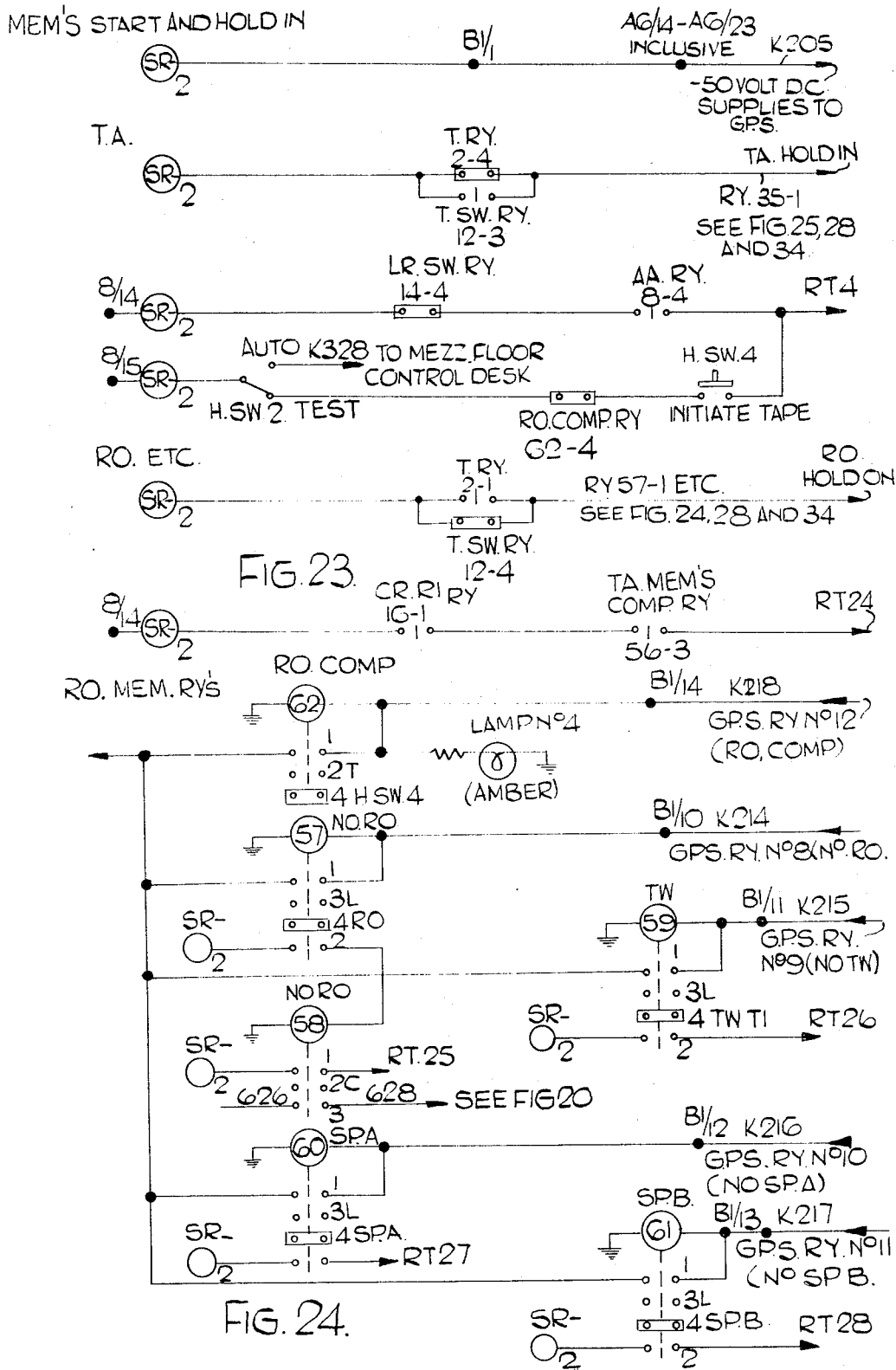

Jan. 10, 1967   A. C. TEAGO   3,297,171
MECHANICAL HANDLING APPARATUS
Filed Jan. 22, 1964   38 Sheets-Sheet 29
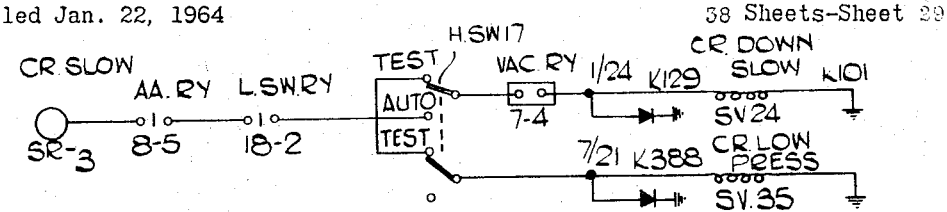
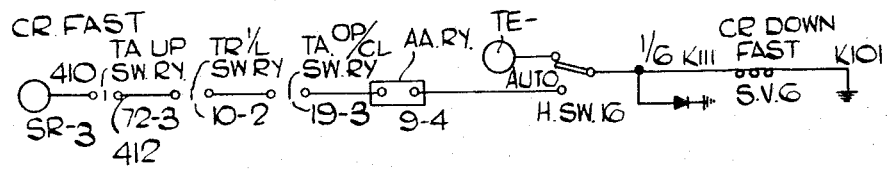
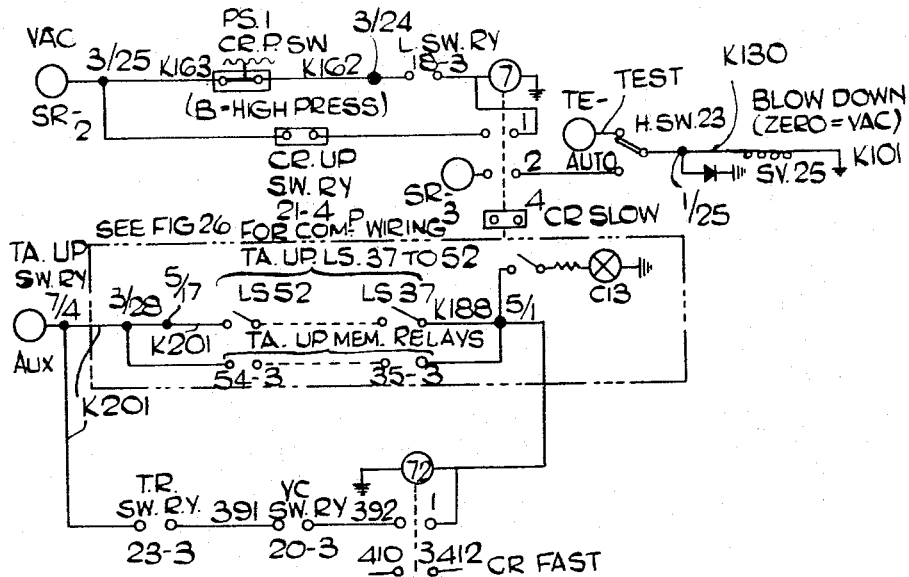
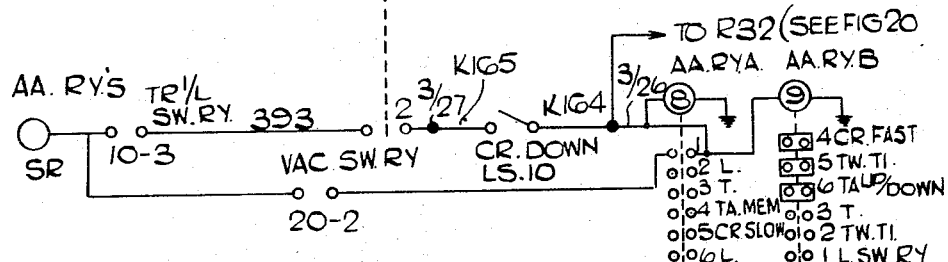
FIG.30.

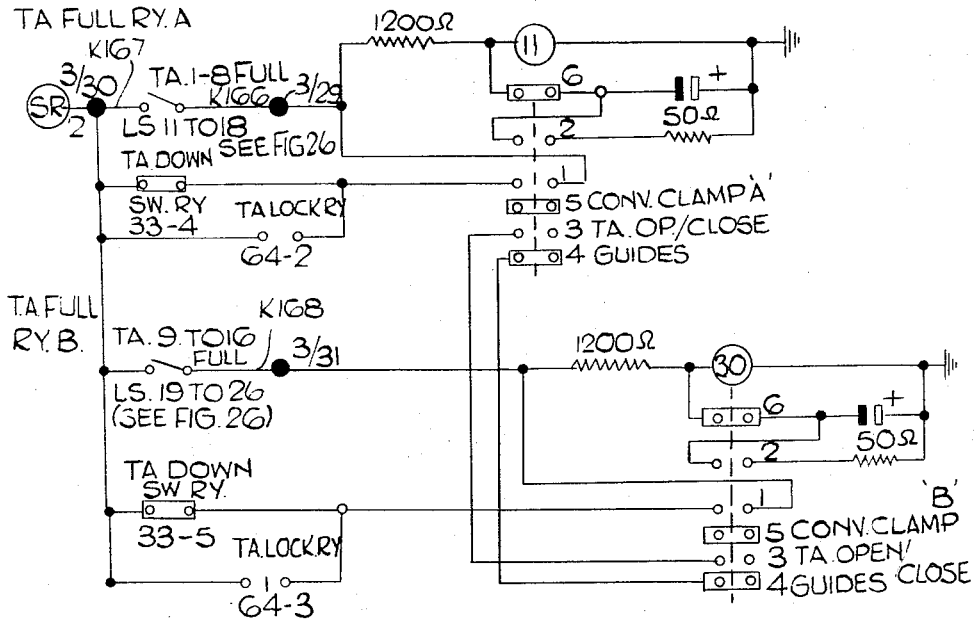
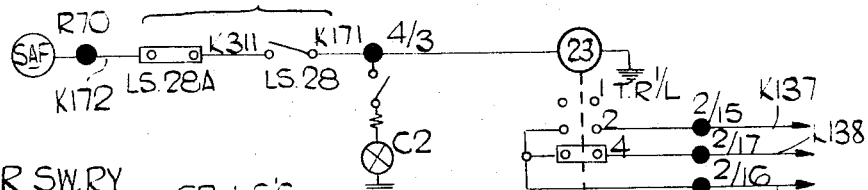
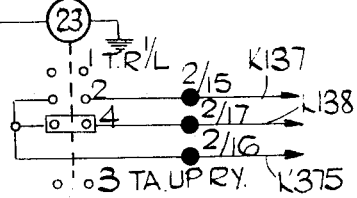
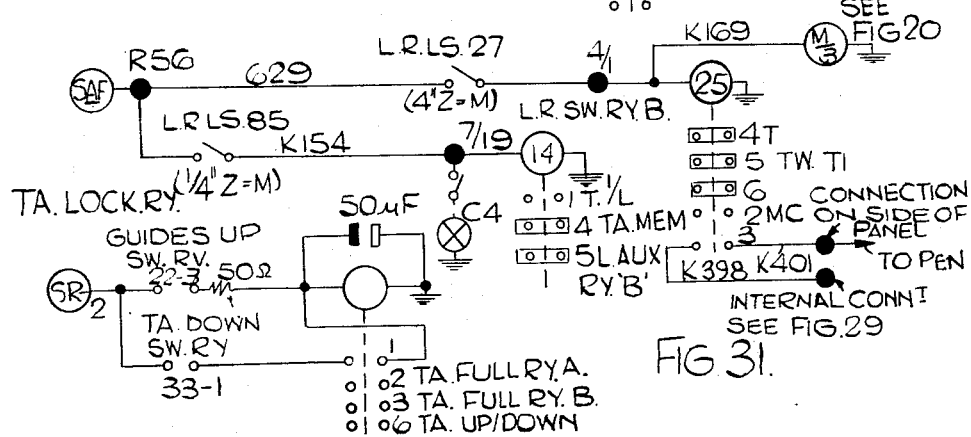
FIG 31.

Jan. 10, 1967  A. C. TEAGO  3,297,171
MECHANICAL HANDLING APPARATUS
Filed Jan. 22, 1964  38 Sheets-Sheet 31
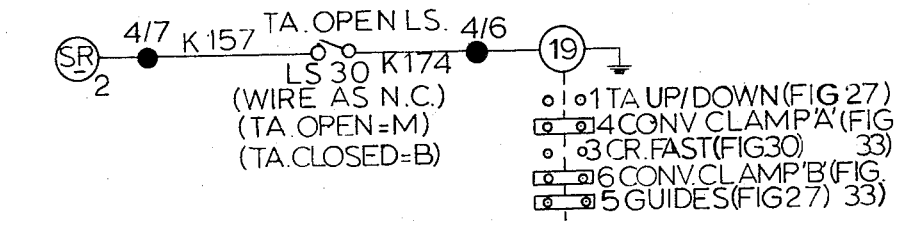
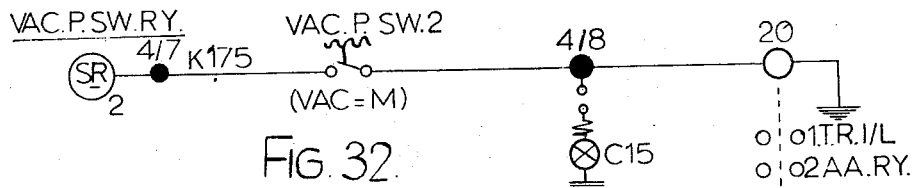
FIG. 32.
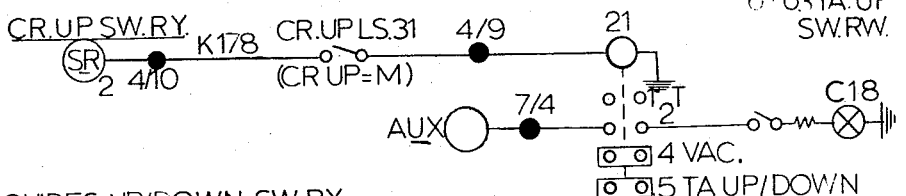
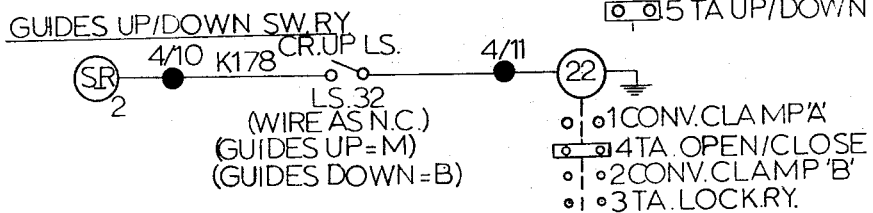
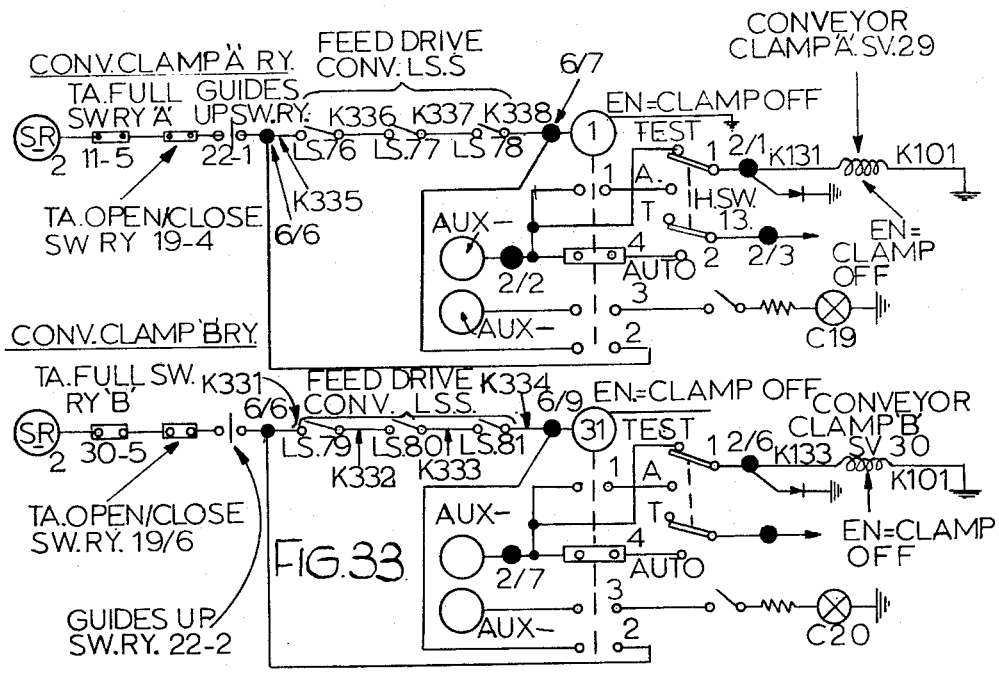
FIG. 33.

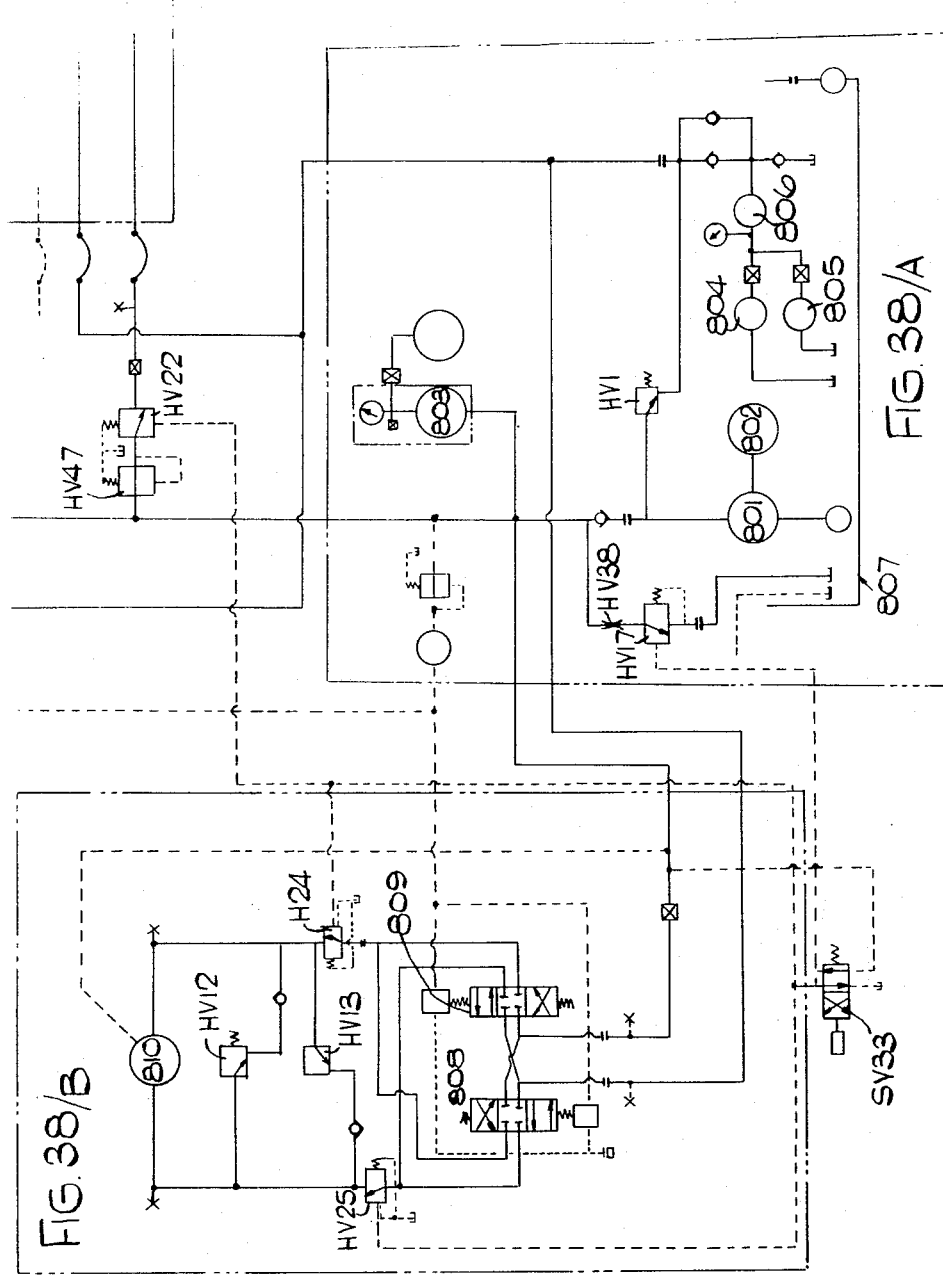

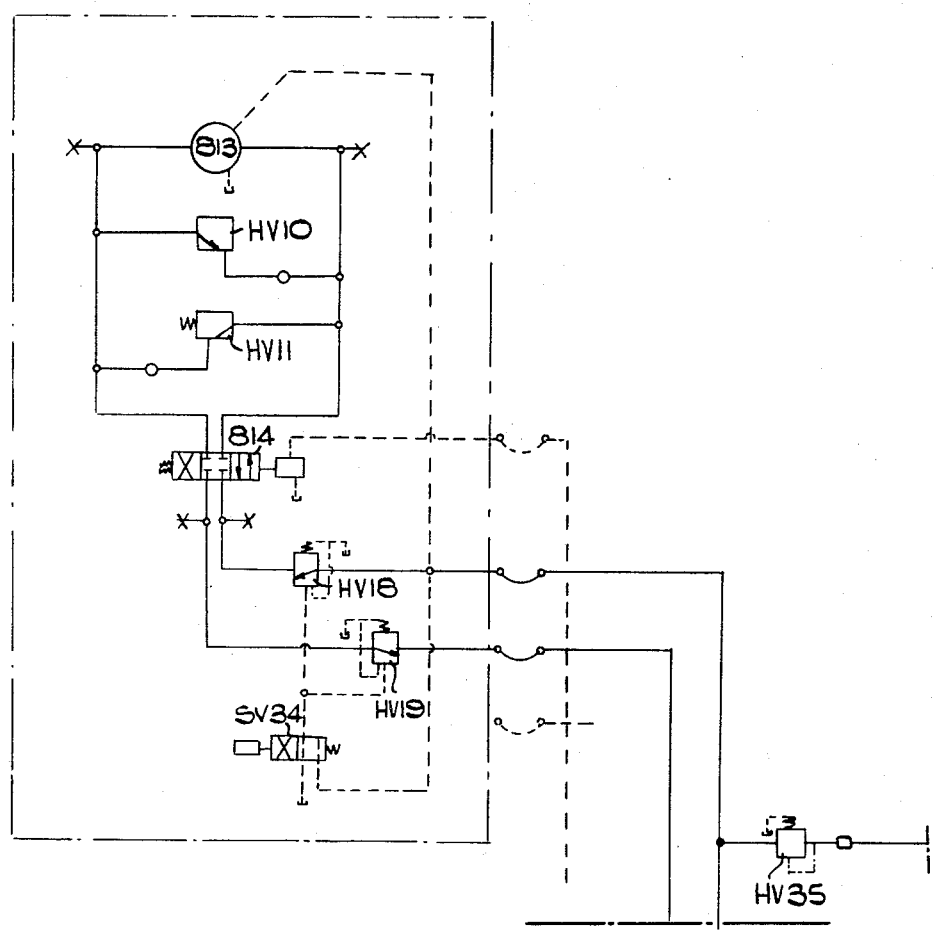
FIG 38/C

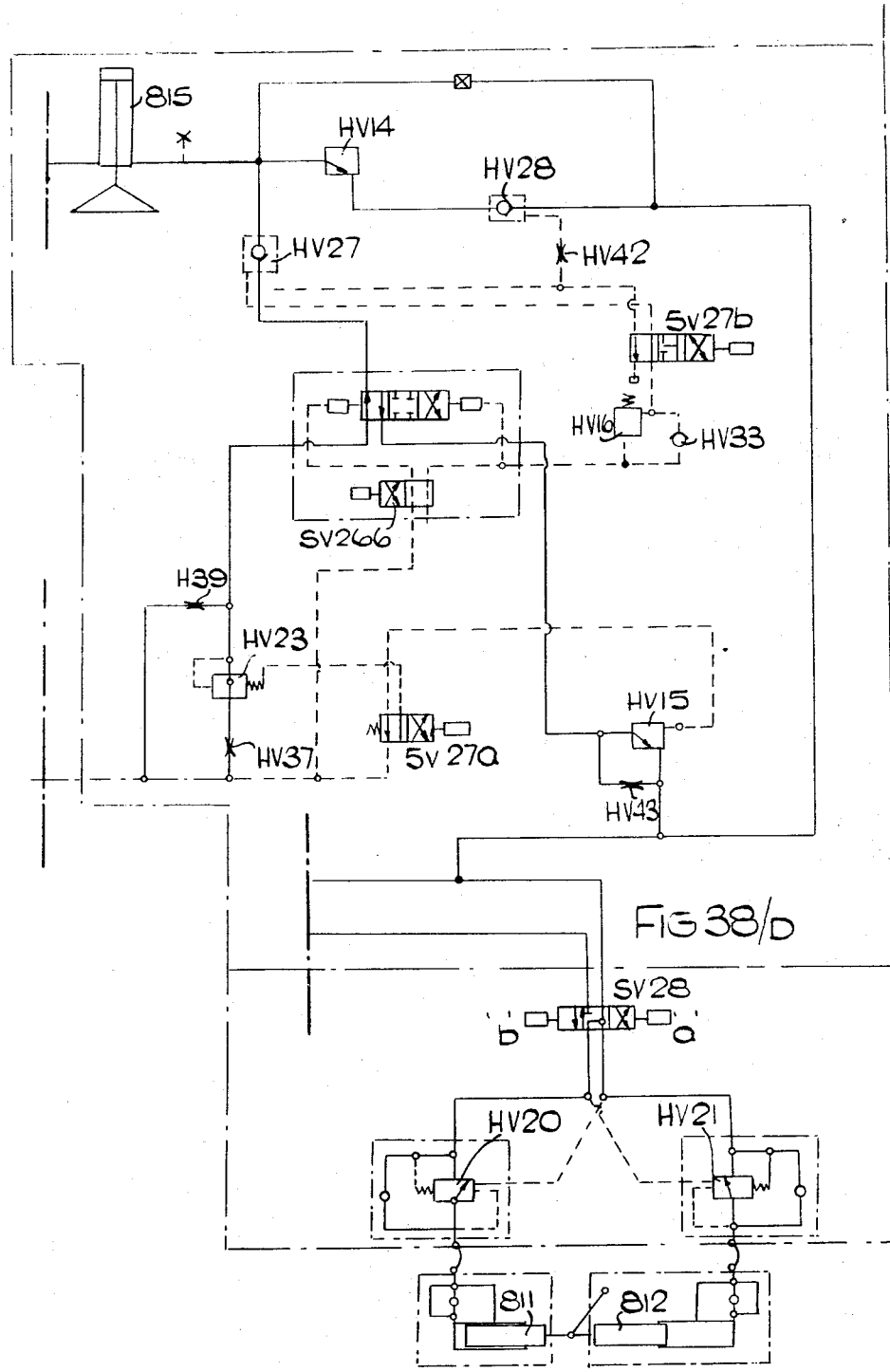

3,297,171
MECHANICAL HANDLING APPARATUS
Antony Charles Teago, Whitehall Orchard, Ifield,
Crawley, Sussex, England
No Drawing. Filed Jan. 22, 1964, Ser. No. 339,556
Claims priority, application Great Britain, Jan. 22, 1963,
2,723/63
5 Claims. (Cl. 214—1)

This invention is concerned with mechanical handling apparatus and although by no means so limited has particular application to the handling of bricks to form them into packs.

In the specification of our copending U.S. patent application Serial No. 103,862, of which this application is a continuation-in-part, we have described apparatus which is suitable for such a purpose. The apparatus of the present invention is a development of the principle on which the machine described in the aforesaid specification operates.

The present apparatus is designed to pick up a predetermined number of articles from one location and to deposit them in any predeterminable pattern at another location. The form of the pattern is determined by a punched tape, the tape being initiated by signals from a relay system and signals from the tape being read by a tape reader and fed into electronic equipment which in its turn either controls the extent of movement of a pick-up head carrying the articles in three basic linear directions or gives signals to the relay system which controls other movements and operations of the head.

Articles are picked up by a pick-up head consisting of a plurality of pick-up pads which may conveniently be of the vacuum controlled type described in the specification of our copending British patent application No. 40,422/62. The head is mounted on a gantry structure for movement in three basic directions, in two mutually perpendicular horizontal directions (hereinafter referred to as "Travel" or "X-axis" and "Cross" or "Y-axis" respectively) and vertically (hereinafter referred to as "Lower" or "Z-axis"). The head is also arranged for other movements as follows:

Rotation about a vertical axis ("Rotate").
Rotation about horizontal axes ("Twist" and "Tilt").
Separation of the pick-up head into two parts about its centre line ("Split A" and "Split B").
Limited movement along the vertical axis ("Creep").

Articles are assembled at a pick-up station consisting essentially of a plurality of individual tables (corresponding to the number of pick-up pads on the pick-up head) to which they are supplied by a system of conveyors. The tables are arranged for limited vertical movement. If, during a picking-up operation the maximum quantity of articles is required to be picked up then all the tables are raised. If, however, only some of the articles are required to be picked up then only those tables carrying those particular articles are raised.

The pick-up station is also conveniently provided with guide means for ensuring correct disposition of the articles on the tables and means for separating the tables slightly from each other, prior to articles on them being picked up.

The system of conveyors is preferably in two main parts one of which accumulates bricks to be fed to the pick-up station and comprises a plurality of individually drivable sections so arranged and controlled that the application of drive to the conveyor as a whole is progressively removed as articles are accumulated on it, the other part (that adjacent the tables) receiving articles from the first part, accumulating them and driving them towards the tables when articles are required to refill tables from which articles have been picked up.

Furthermore clamping means for holding the articles at the end of the second part during a picking up operation and prior to their being driven towards supply tables are conveniently provided.

The various operations of the tables, conveyors and clamping means referred to above may all be controlled via the relay system.

The gantry structure supports a first carriage which is arranged for movement along the X-axis the first carriage carrying a second carriage arranged for movement along the Y-axis. Mounted on the said second carriage is a hydraulic cylinder carrying the pick-up head, said cylinder being actuable vertically for the Z-axis movement. The X-axis carriage is displaceable by two ball lead screws which are servo-hydraulically actuable. The extent to which the servo motor rotates the ball lead screws and hence the extent of movement along the X-axis is controlled by the electronic equipment. With the X-carriage which is displaced by a single servo hydraulically operated ball lead screw the extent of movement is similarly controlled. As far as the Z-axis is concerned the extent of displacement of the hydraulic cylinder is also controlled via the electronic equipment and the relay system.

Apart from controlling the extents of movement in the X, Y and Z axes the electronic equipment is used to determine whether movements such as Rotate, Twist, Split and Creep referred to above take place, the actual movements if they are to take place being governed by the relay system.

The electronic equipment is a digital co-ordinated setting system which may conveniently be divided into 4 parts.

(a) The input system which comprises the tape reader, comparison and sorting units and a command analyser.

(b) The X-axis positional control system which comprises the storage and comparison units and the necessary electric circuits to provide appropriate signals for the control of the servo motor.

(c) The Y-axis positional control system which is basically the same as that for the X-axis.

(d) The Z-axis positional control system which operates two relays (part of the relay system) one controlling the lower deceleration and the other stop of the lower movement.

At the start of a cycle a signal is given to the tape reader to read the tape, the information thereby obtained being fed into the electronic equipment which, depending on the nature of the information, will either be processed to control X, Y or Z movements or to provide a signal to the relay system which controls other operations and movements.

The relay system controls or effects such other operations and movements via appropriate switches and solenoid valves mounted on the machine.

When a given operation or movement (controlled either by the electronic equipment or the relay system) has been initiated and/or completed an appropriate signal is sent back to the electronic equipment for the tape reader to read the tape and the next operation in the cycle is initiated.

The condition of the machine prior to commencement of a cycle is as follows:

Travel (T), frame at zero, i.e. over pick-up station
Cross (C), frame at zero, i.e. central over-pickup station
Lower (L), column at zero
Rotate (RO), returned
Twist (TW), returned
Tilt (TI), returned
Split A (SPA), returned
Split B (SPB), returned Creep (CR), returned
Vacuum on
Blow down off
Table (TA) and Move-car (MC) relay memory bank complete RO, TW, SPA and SPB relay memory bank complete
TA up
TA open
Guides down
Clamp A on
Clamp B on The full cycle of the machine is as follows. In this detailed explanation of the cycle various references are made to signals from the electronic or relay systems which have not previously been referred to. They are however referred to in the subsequent specific description in this specification and when viewed in the context of that description these references will, it is believed, be perfectly clear.

(1) Creep down fast (at this stage the bricks are picked up).

(2) Creep up.

(3a) Signal RT1 (read tape) is given by the relay system to the electronic equipment.

(3b) Twist commences.

(3c) Tilt commences.

(3d) Split A commences.

(3e) Split B commences.

NB operations 3a–3e inclusive occur simultaneously.

(4) The X-axis movement information on the tape is read by the tape reader and transferred to the electronic equipment which, as hereinafter described, causes the travel (X) carriage to move towards the demanded (predetermined) position.

(5) A "Read-in complete" signal is given by the electronic equipment to the relay system.

(6) After a short movement of the travel carriage, Rotate commences.

(7) After Rotate commences signal RT2 is given.

(8) The Y-axis movement information on the tape is read by the tape reader and transferred to the electronic equipment which, as hereinafter described, causes the cross (Y) carriage to move towards the demanded (predetermined) position.

(9) When the X and Y axes movements are complete "position complete" signals are given by the electronic equipment to the relay system and when the other movements described above as commencing (3b–3e) are complete, signal RT3 is given.

(10) The Z-axis information on the tape is read by the tape reader and transferred to the electronic equipment.

(11) When "read-in complete" signal is received by the relay system lower (Z) commences.

(12) When lower has commenced signal RT4 is given.

(13) The Table and Move-car information on the tape is read by the tape reader and transmitted to the electronic equipment and from there to the relay system. The reading of this information continues until an "information complete" signal is received.

(14) When the lower movement is within 12″ of the demanded position a signal is transmitted from the electronic equipment to the relay system and from there to the Z-axis hydraulic valves to initiate deceleration.

(15) When the Z-axis movement is complete a signal is transmitted from the electronic equipment to the relay system and from there to the Z-axis hydraulic valves and the movement is arrested. This same signal is used through the relay system to initiate Tilt return and Creep down slow simultaneously.

(16) When the bricks contact the brick pack a change of pressure in the creep cylinder is sensed by a pressure switch and the vacuum changed to "blow down" and creep down slow stops simultaneously.

(17) When the pressure in the vacuum hose rises to a predetermined figure a pressure switch is operated and creep up and Lower return (i.e. raise) are initiated simultaneously.

(18) 8″ before Lower returns to zero a limit switch is operated and Lower return deceleration commences.

(19) 4″ before Lower returns to zero Twist return is initiated.

(20) When Twist return has commenced the following actions are initiated simultaneously.
 (a) Signal RT22 is given.
 (b) Split A return commences.
 (c) Split B return commences.
 (d) Rotate return commences.

(21) The X-axis movement information on the tape is read by the tape reader and transferred to the electronic equipment which, as hereinafter described, causes the travel carriage to return towards zero.

(22) During or immediately following 20 and 21 above Lower return will continue until it reaches zero.

(23) When the read-in of X-axis information for return to zero is complete a "read-in complete" signal is transmitted from the electronic equipment to the relay system.

(24) On receipt of "read-in complete" signal, signal RT23 is given.

(25) The Y-axis movement information on the tape is read by the tape reader and transferred to the electronic equipment which, as hereinafter described, causes the cross-carriage to return towards zero.

(26) When the Y-axis "read-in complete" signal is received by the relay system, signal RT24 is given.

(27) The read-in of information for Rotate, Twist, Split A and Split B continues until an "information complete" signal is received by the relay system.

(28) When all the return movements described above are complete the machine condition will be as described at the start of the cycle.

The cycle described above is that of the movement of the pick-up head. The following is a description of the cycle at the pick-up station.

(29) When Creep up (see 2 above) is complete Tables down commences.

(30) When Tables down is complete Tables close commences.

(31) When Tables close is complete Guides up commences.

(32) When Guides up is complete Clamps off occurs.

(33) As Clamps off commences pneumatic drive is applied to the feed-drive conveyor and bricks are moved to the pick-up station.

(34) When the pick-up station is completely full with bricks Clamps on occurs.

(35) When Clamps on is complete the drive to the conveyor is removed and Guides down commences.

(36) When Guides down is complete Tables open commences.

(37) When Tables open is complete and the "Table information complete" signal has been received (as at 13 above) Tables up commences.

(38) When Tables up is complete and the machine return movements are complete as described at 28 then the next cycle will commence.

It is possible by means of the information taken from the tape during operations 13 and 27 above to control the number of Tables that are raised to offer bricks to the pick-up head and also to inhibit Rotate, Twist, Split A or Split B during the following cycle.

The following description with reference to the accompanying drawings of one embodiment of a brick setting machine in accordance with the invention is, for the sake of clarity, divided into 4 main parts.

(1) The structure of the machine (FIGURES 1 to 18 inclusive).

(2) The pneumatic system (FIGURES 19 and 20).

(3) The relay system (FIGURES 21 to 36 inclusive).

(4) The electronic and hydraulic systems (FIGURES 37 and 38).

Reference will first be made to FIGURES 1 to 20 of the accompanying drawings in which FIGURE 1 is a general perspective view of an automatic brick-setting apparatus according to the invention;

FIGURE 2 is a side elevation partly cut-away of the singulator-accumulator conveyor of FIGURE 1;

FIGURE 3 is a side elevation, partly cut away, of the accumulator conveyor and guide rail of FIGURE 1;

FIGURE 4 is a plan view of some of the rollers of the conveyors showing their relative disposition;

FIGURE 5 is a side elevation of one belt-drive system of the conveyors of FIGURES 2 and 3 in its driving position;

FIGURE 18 is a schematic diagram showing the pneumatic system of the singulator-accumulator and accumulator conveyors and the clamping station of the apparatus of FIGURE 1;

FIGURES 23, 24 and 25 illustrate memory relay circuits for use with the invention;

Figure 26:
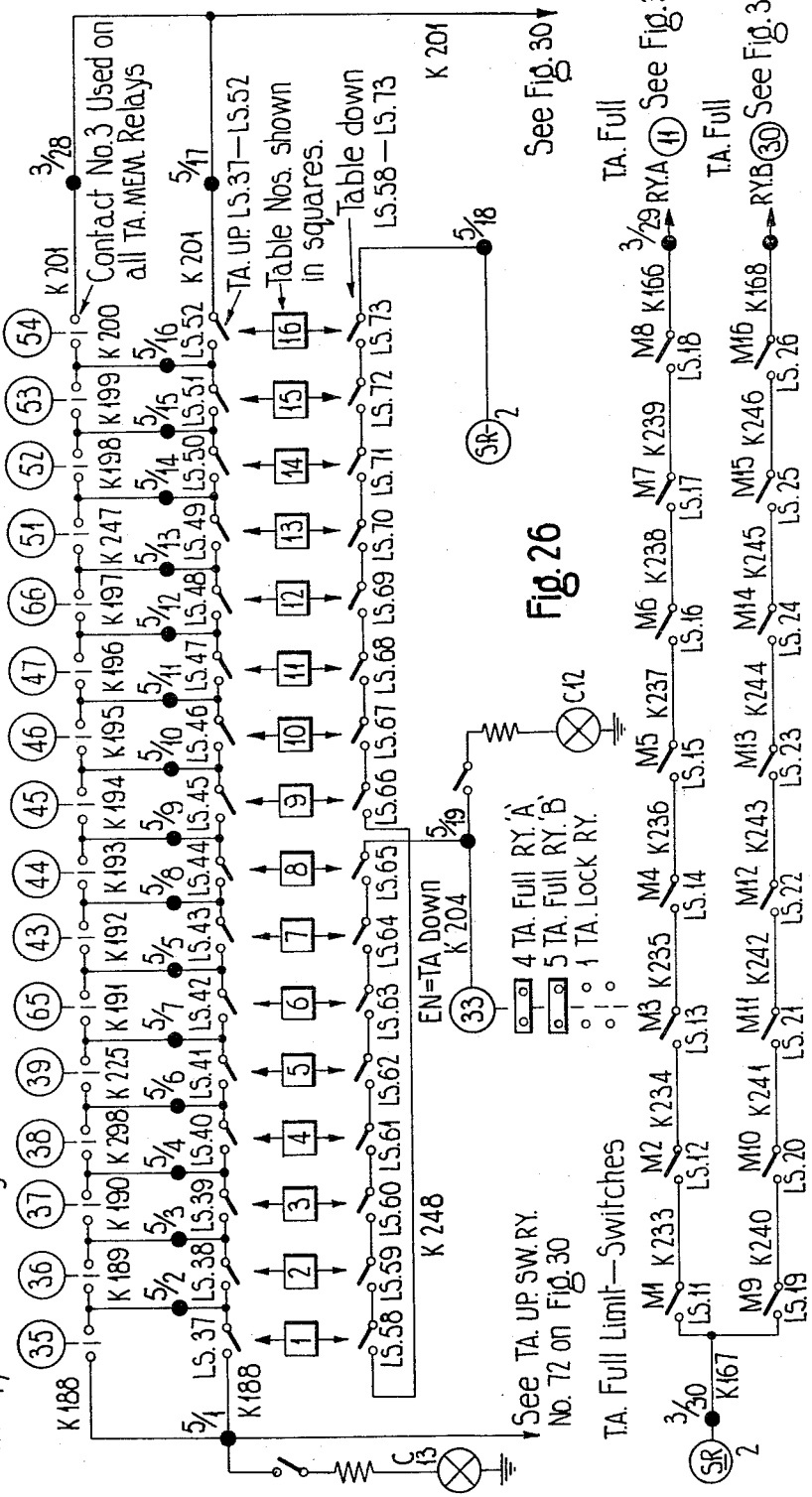
Figure 27:
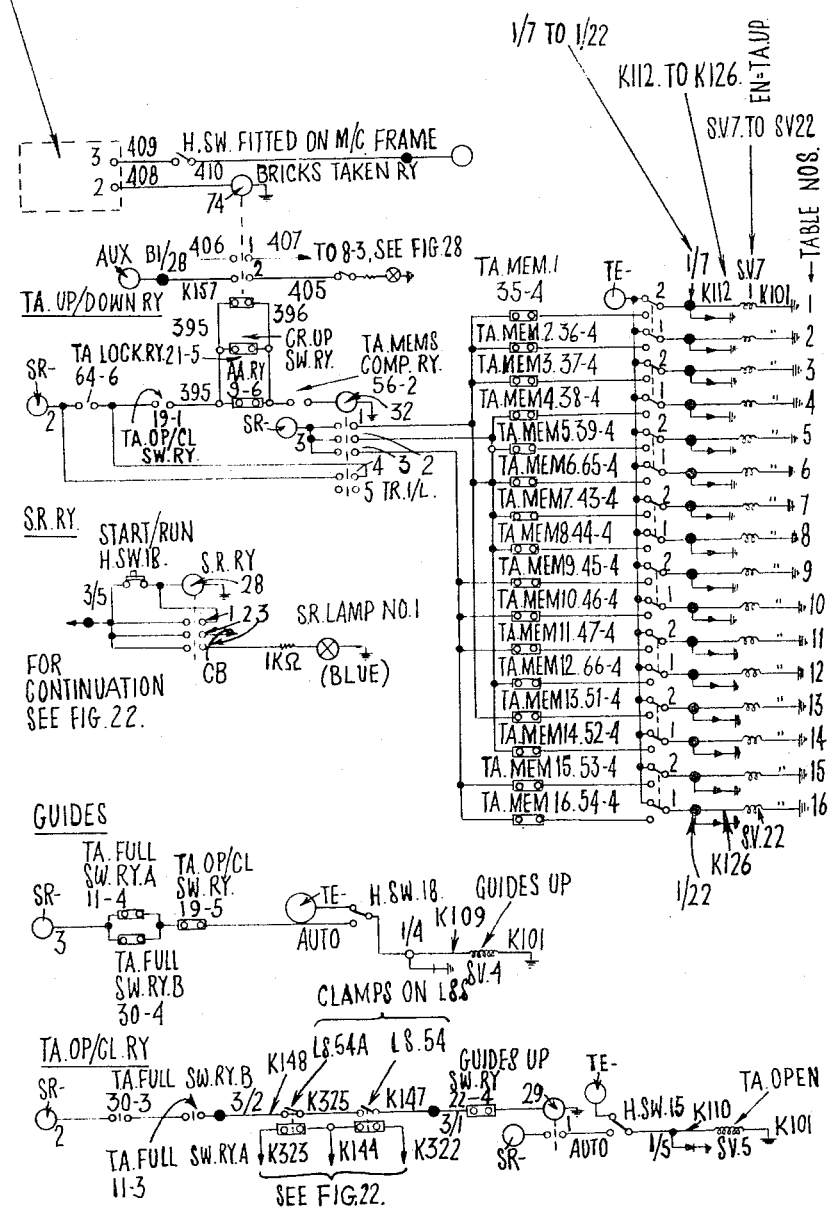
Figure 29:
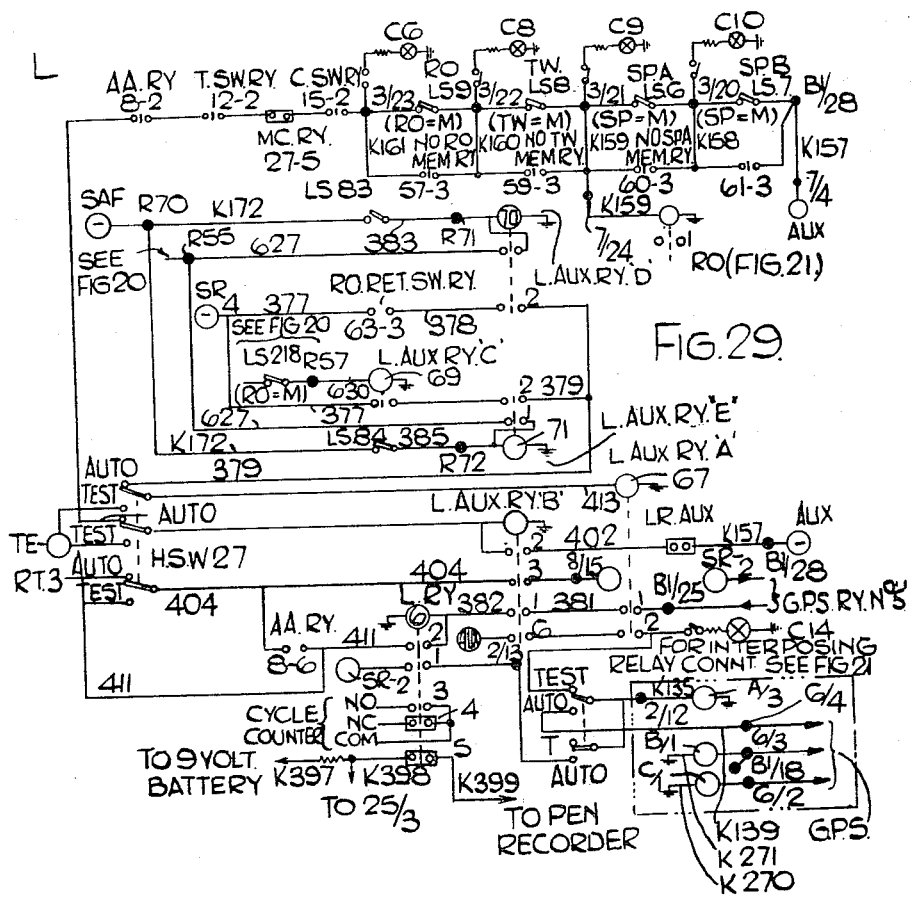
Figure 34:
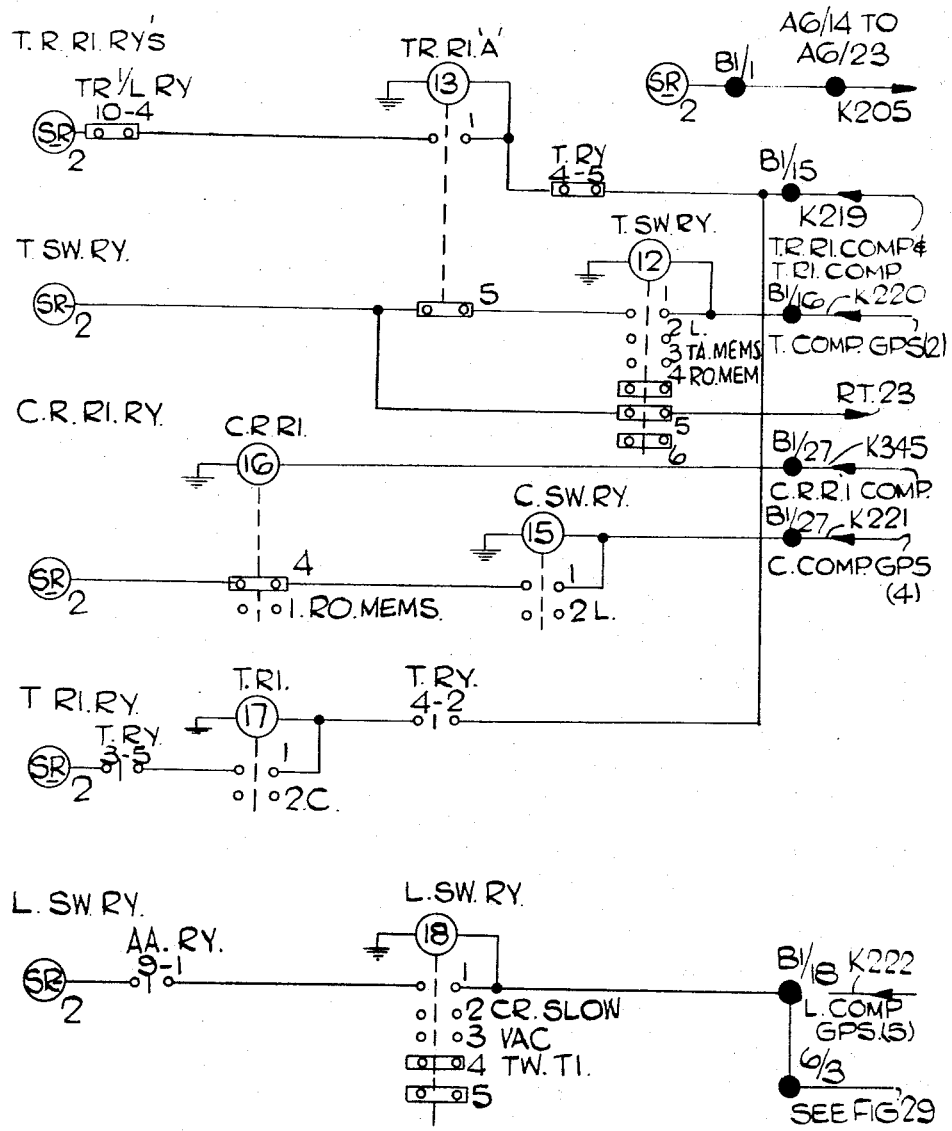
Figure 35:
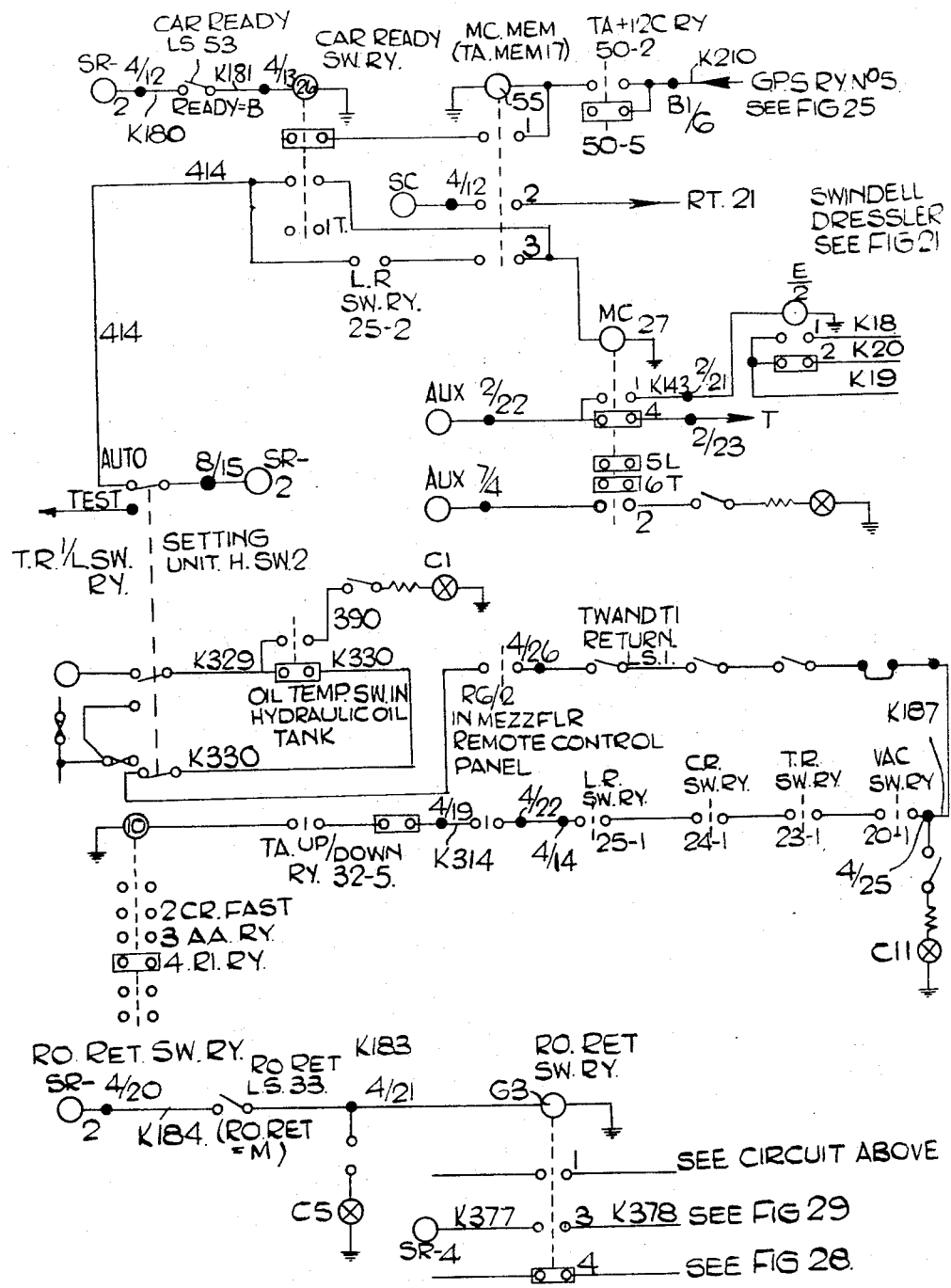
Figure 36:
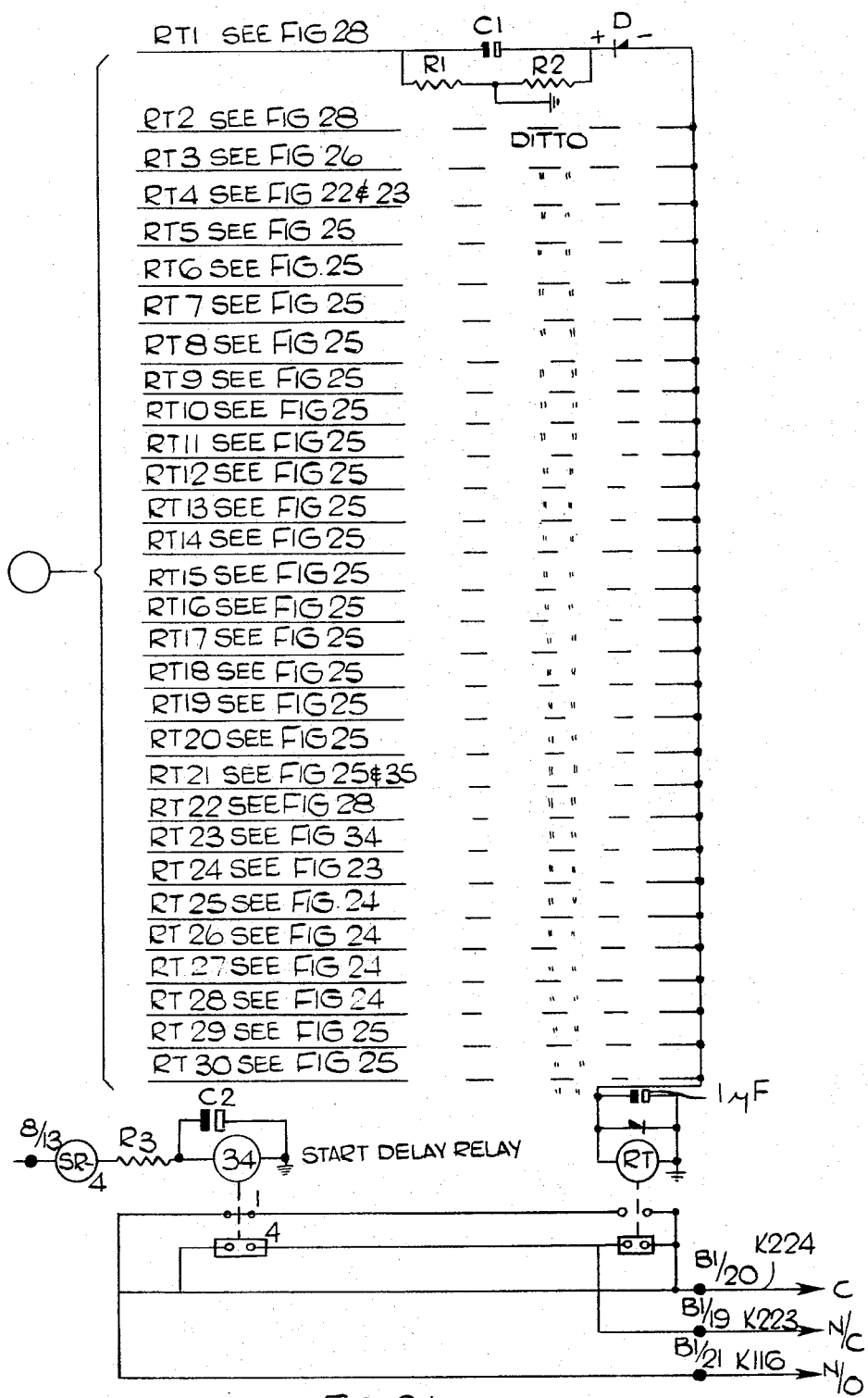
Figure 37:
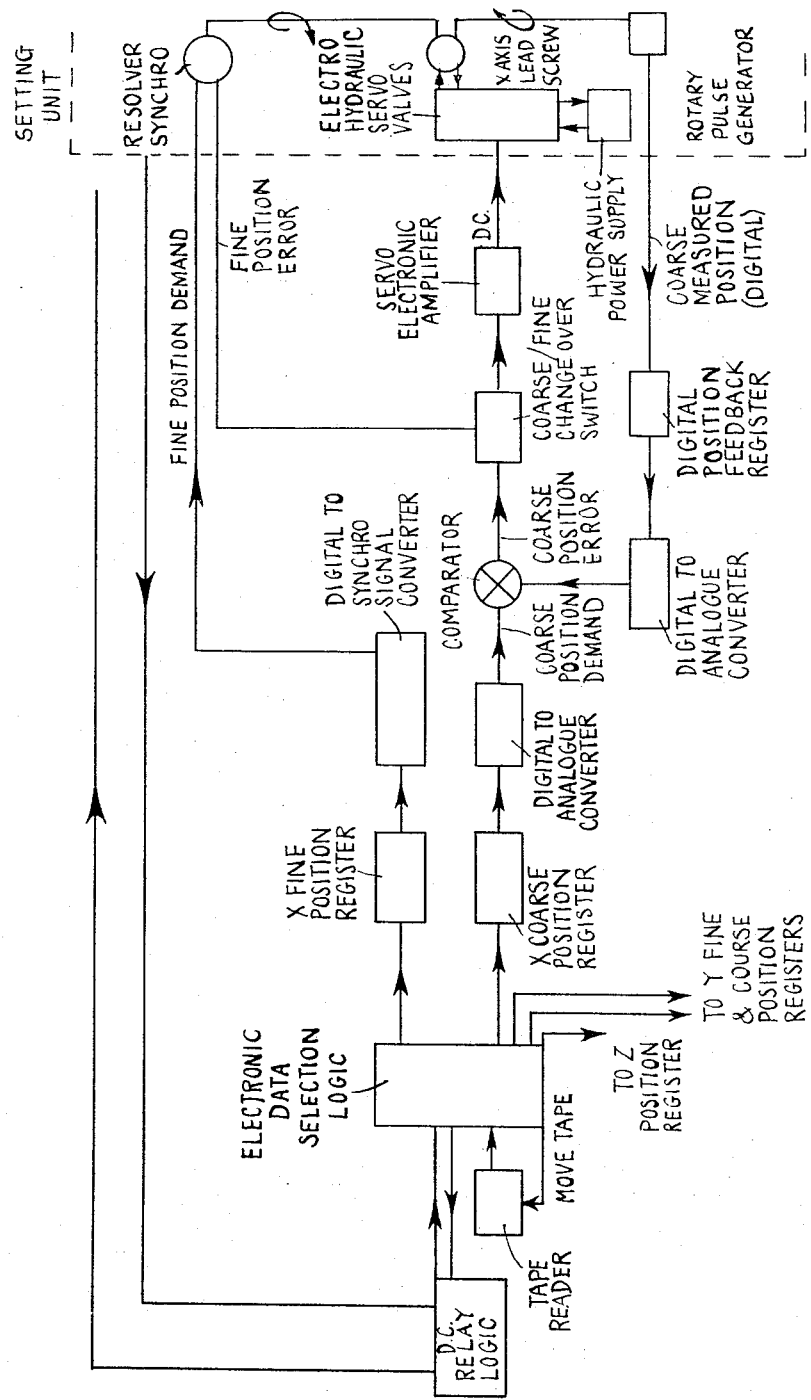

FIGURE 26 provides a circuit diagram of the table relays and limit switches;

Figure 28:
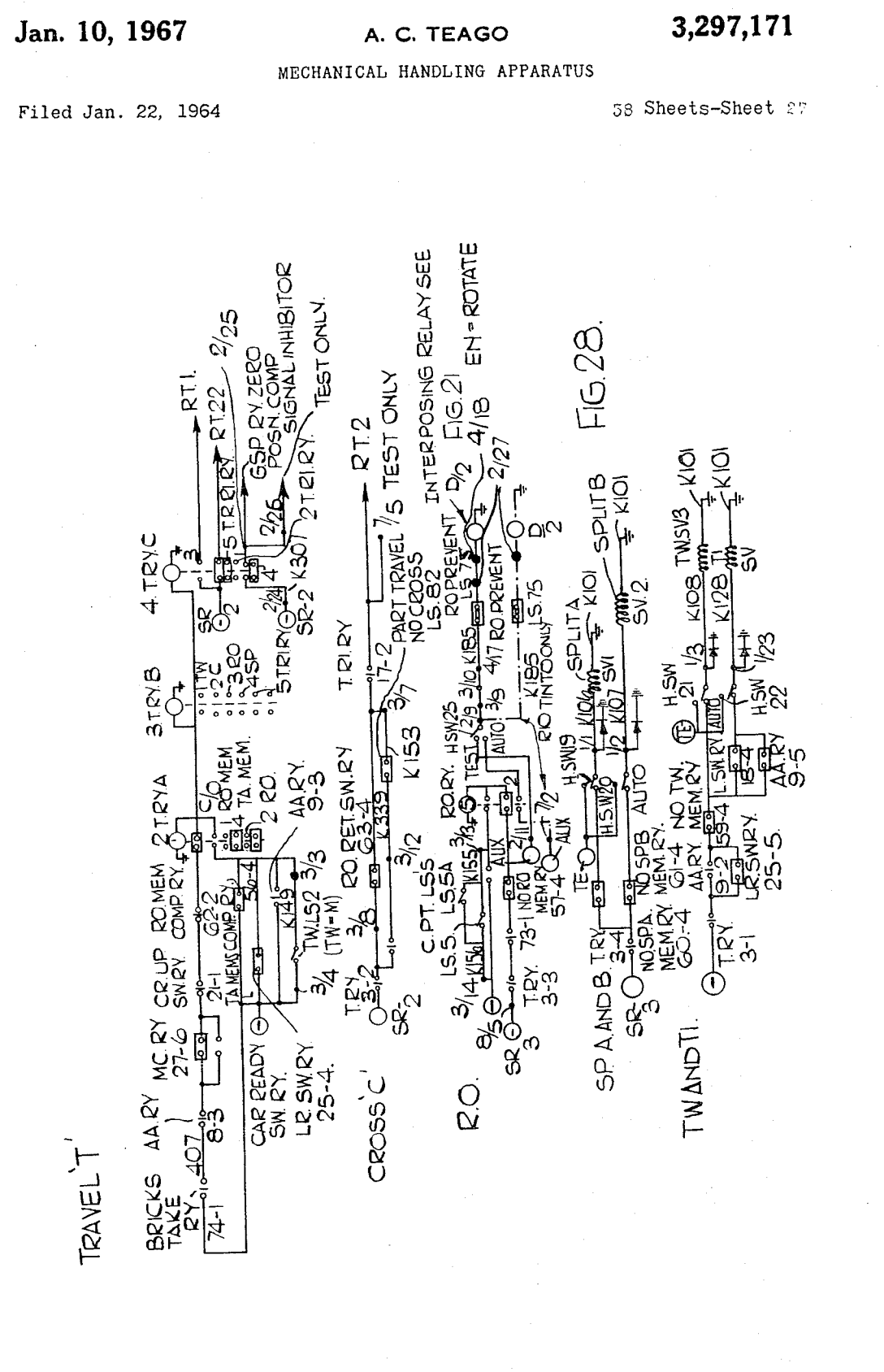

FIGURES 27 through 35 are schematic circuit diagrams of various control circuits for use with the instant invention;

FIGURE 36 is a diagram of the circuit for generating the read-tape signals;

FIGURE 37 is a schematic diagram of the positional control equipment in accordance with the invention; and FIGURES 38A through 38E are schematic diagrams of the hydraulic system in accordance with the invention.

Referring to FIGURE 1, the brick-setting apparatus comprises in series a singulator-accumulator-conveyor 101, an accumulator conveyor 102, a clamping station 103 and a pick-up station 106. Both the conveyors 101 and 102 are mounted on adjustable supports 104 and fitted with side guides 114 and an air pressure manifold 613. Over the pick-up station 106 is a support frame 107 carrying support means 108 for a pick-up head 109. Under the support frame are rails 113 on which run a kiln car 112 on which packs of bricks are to be built up. By this apparatus, the constituent parts of which will be fully described hereinafter, bricks 117 entering the singulator accumulator conveyor 101 from any convenient conventional conveyor means are formed into a pack 111 of predetermined dimensions and arrangement on the car 112 on which they are taken to kilns to be fired.

Considering in more detail the singulator-accumulator conveyor 101 and referring to FIGURES 2 and 4 of the drawings, the conveyor structure comprises side plates 122 adjacent plates being interconnected by splice plate 131 and channelled cross-members 123 supported, through brackets 124 by the adjustable supports 104. The conveyor has two trains of rollers 118 underneath which are endless belts 119 supported at each end of their travel by rollers 121, on their return by idler rollers 126 slung under the conveyor structure on brackets 127, and each supported underneath and adjacent their respective train of rollers 118 by a series of retractable belt support devices 128 which will be described in greater detail hereinafter. The belt support devices 128 are mounted on the cross-member 123. Each train of rollers 118 has at its ends a short train of idler rollers 129.

The rollers 118 and 129 are mounted on the side plates 122 and on a centre plate 132 which are also mounted on the cross-members 123. The rollers are mounted in herring bone formation in that the axles 133 of the rollers of the two trains are alternately mounted on the centre plate 132 and have their outside ends trailing slightly so as to urge a brick travelling along the rollers 118 towards the outer edge of the conveyor. In practice the bricks are prevented from falling off this edge by a guide rail which together with a pressure manifold is shown and described hereinafter with reference to the accumulator conveyor (FIGURE 3) but which have both been omitted from FIGURES 2 and 4 for the sake of clarity.

Referring now to FIGURE 3 which shows the accumulator conveyor 102 in greater detail, this conveyor has rollers 134, belts 136, belt-support rollers 137, side plates 138, cross-members 139, support brackets 141, belt-supporting idler rollers 142, idler-roller-support brackets 143, retractable belt support devices 144, idler conveyor rollers 146, and a centre plate (not shown) arranged in the same way as described with reference to FIGURES 2 and 4. In addition there is shown in FIGURE 3 the air pressure manifold 613 mounted on the side plates 138 by struts 149 and side guides 122 mounted on the side plates 138 by brackets 151. Also shown is an electric motor 152 which supplies drive to the belt 136 through a drive mechanism guarded by shield 154. The motor 152 and mechanism are slung below the conveyor on motor mount bracket 156. The singulator-accumulator conveyor as already described, also has an extension of the air pressure manifold 613 and the side guides 114; it also has its own motor and drive mechanism and shield, mounted in the same way beneath the conveyor, but as already explained these are omitted from FIGURE 2 for the sake of clarity and simplicity.

It will be appreciated that there is no fundamental constructional difference between the singulator-accumulator conveyor 101 and the accumulator conveyor 102. The difference does lie in the system of control of the application of drive to the rollers. This application, governed by the retractable belt support devices 128 and 144 respectively will be described with reference to FIGURE 5. These devices 128 and 144 are controlled by a pneumatic system the location and operation of which will be described with reference to FIGURE 18 of the drawings. The component parts of this system are known in themselves and are no part of the invention. Accordingly they have been omitted from FIGURES 2, 3 and 4 so as not to obscure the important constructional parts of the conveyors.

Turning now to FIGURE 5 which illustrates one of the retractable belt support devices 128 of the singulator-accumulator conveyor 101 which is representative of the others on this conveyor and on the accumulator conveyor 102, the device is mounted on a cross member 123 beneath belt 119 and the rollers 118 whose axles 133 rest in slots 157 in the upper edge of the side plate 122. The device comprises a single acting spring return pneumatic cylinder 158 connected by means of nut connections 172 to air inlet and vent pipes 161 and 162 respectively and mounted by a pivot pin 163 on a trunnion 164. At its outer end the piston rod 166 of the cylinder 158 is connected by a cap head screw 167 to the pressure-roller assembly which comprises tie bars 171 having three crossbars 168 to each of which is pivotally attached, by means of clips 169 and pivot pins 173 a bracket 174 having pressure rollers 176 mounted by axles 177 thereon. The pivot pins 173 are pivotally connected to the side plate 122 and centre plate 134 (FIGURE 4) of the conveyor 101. Thus when the cylinder 158 is expanded to the position shown in FIGURE 5 the rollers 176 support the belt 119 in such a way as to contact, and thus drive, six of the rollers 118. To this end the device is so positioned that with the cylinder 158 expanded, the axles 177 of the rollers 176 are equidistant from the axles 133 of adjacent rollers 118. When the air pressure is released from the cylinder 158 which therefore retracts the pressure wheel brackets 174 pivot about the pivot pins 173 the pressure rollers 176 thus moving downwards and allowing the belt 119 to come out of contact with the rollers 118 which consequently stop.

In order to ensure correct positioning of the pressure wheels 176 with relation to the rollers 118, the trunnion 164 is adjustable to the position shown in dotted lines. For any given adjustment of the trunnion 164, to ensure that the correct amount of pressure is exerted by the pressure wheels 176 on the belt 119, a spring clamped device is provided on the piston rod 166 of the cylinder 158. This comprises connecting block 629 to which both the piston rod 166 and the cap head screw 167 are in threaded engagement. Between lock nut and washer 631 and 632 respectively and the bracket 174 is a spring 159 to absorb excess travel of the rod 166.

Figure 6:
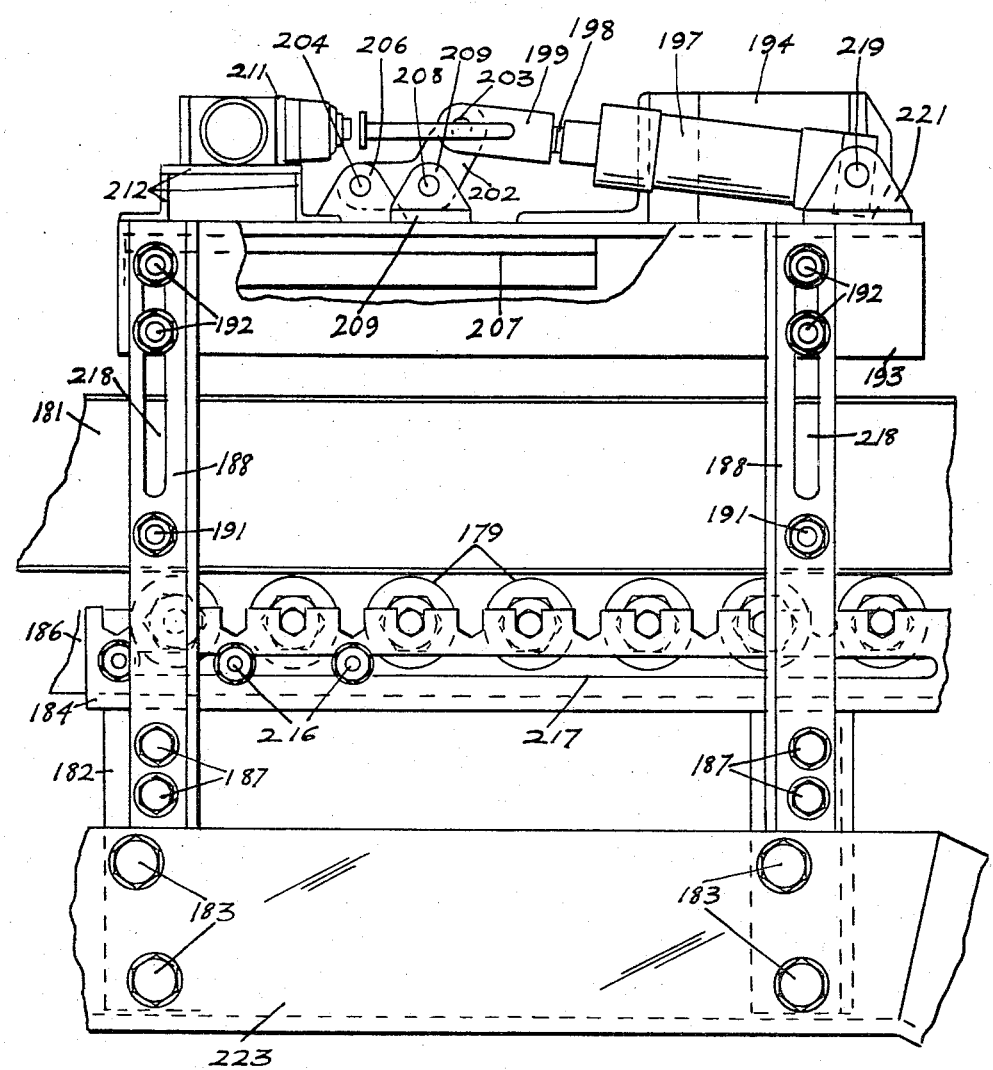
FIGURE 6 is a side elevation of the clamping station of FIGURE 1 with one of the solenoid valves removed.
Figure 7:
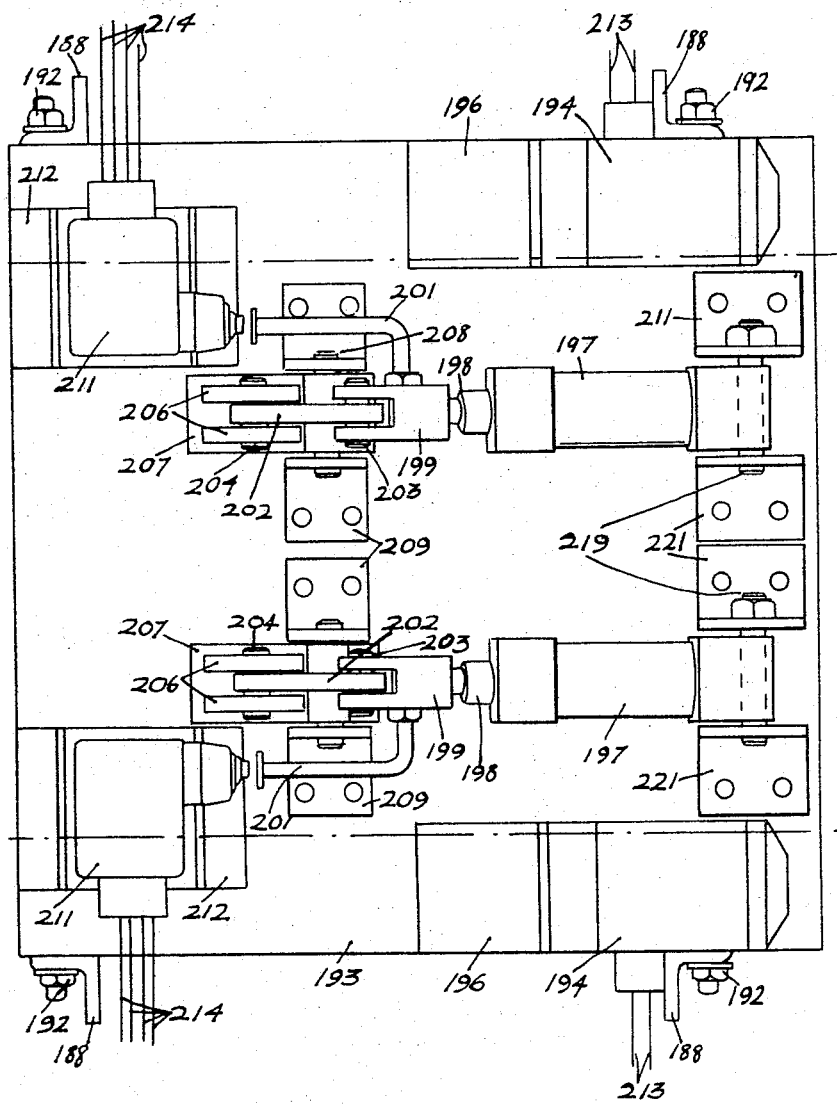
FIGURE 7 is a plan view of the clamping station of the apparatus.

The bricks 117 after passing along the singulator-accumulator conveyor 101 and the accumulator conveyor 102 pass to the clamping station 103 which is shown in FIGURES 6 and 7.

At the clamping station, idler rollers 179 and side plate 181 are continuations of idler rollers 146 and side plate 138 of the accumulator conveyor. Support angle 182 is bolted to side angle member 223 of the pick-up station by bolts 183 and welded to roller-support brackets 184 which in turn is bolted to roller-support bracket 186 by bolts 216. The roller-support brackets carry idler rollers 179. Bolted by bolts 187 to the support angles 182 are the main clamp supports 188 to which side guides 181 are also bolted by bolts 191. Mounted on clamp supports 188 by bolts 192 is clamp plate 193 which is shown partly cut away in FIGURE 6 and which carries the two main clamp mechanisms, one for each train of the conveyors. Each mechanism comprises solenoid valve 194 (SV 29 and 30) fixed to the clamp plate 193 by bracket 196, this valve controlling pneumatic single-acting spring-return cylinder 197 whose piston rod 198 is fitted with fork coupling 199 and angled push rod 201. The coupling 199 is pivotally connected by pin 203 to one end of bell-crank 202, which is pivotally connected by pin 204 at its other end to a bracket 206 on the upper side of clamp pad 207 and pivots at its angle about pin 208 in brackets 209 mounted on the clamp plate 193. The cylinders 197 are pivotally connected by pins 219 in brackets 221 to clamp plate 193. The mechanism thus constitutes a bell-crank mechanism so arranged that when the cylinder 197 expands and retracts, the clamp pads 207 will be moved down and up respectively thus holding and releasing the bricks at the time at the clamping station. Each angled push rod 201 is opposite a double pole double throw switch 211 (LS 54 and 54A) mounted on the clamp plate 193 by mounting bracket 212 and is at such a distance therefrom that as the cylinder expands and retracts, the push rod operates throws the switch.

In practice the push rod 201 also has a spring clamped device as described with reference to piston rod 166 of cylinder 158. This is not shown on FIGURES 6 and 7 for the purposes of clarity of the drawings. The signals which operate the solenoid valves 194 are received through wires 213 and the switches 211 each make or break two circuits through wires 214. The electrical and pneumatic circuits are explained hereinafter in detail. The clamp station is adjustable in the horizontal and vertical directions because bolts 216 which connect the brackets 184 and 186, and bolts 192 can be slidably adjusted in slots 217 and 218 in brackets 184 and clamp supports 188 respectively. It will be appreciated that since the clamp plate 193 carries two equivalent clamping mechanisms, see FIGURE 7, one for each train of bricks through the apparatus, bricks on different trains can be independently clamped.

Figure 8:
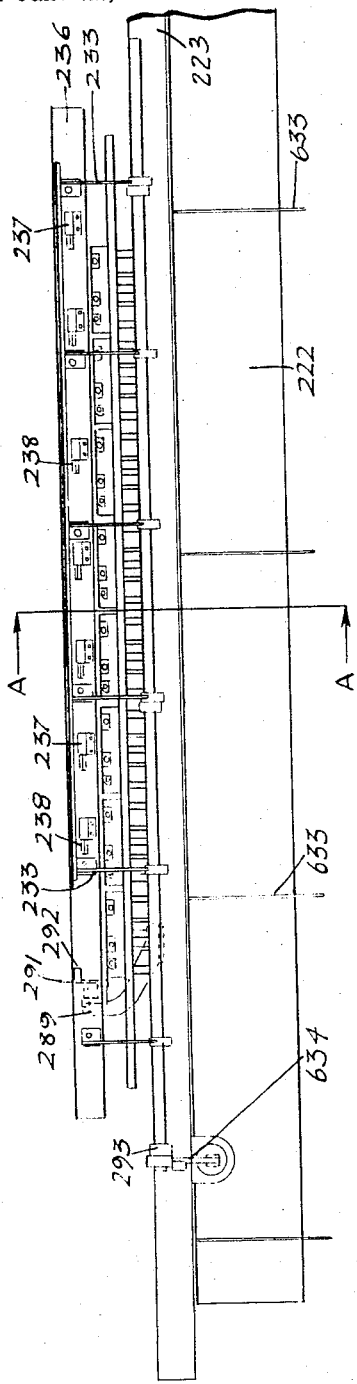
FIGURE 8 is a general view of the pick-up station of the apparatus of FIGURE 1.
Figure 9:
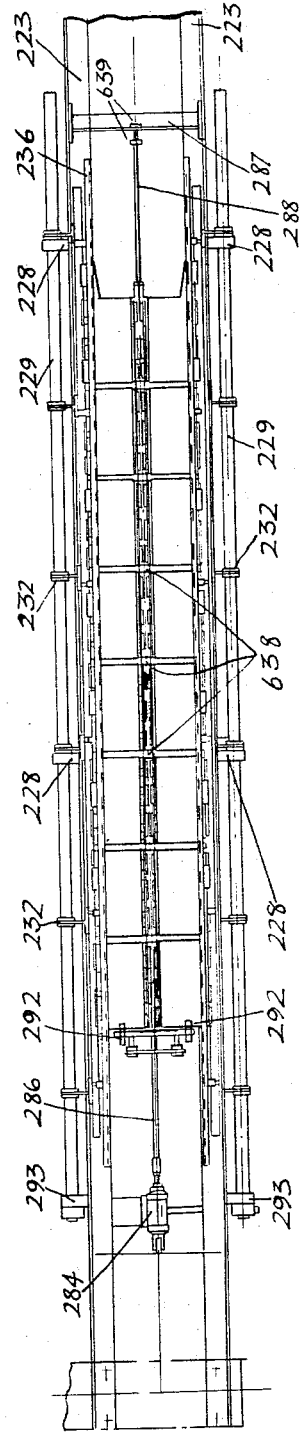
FIGURE 9 is a plan view of FIGURE 8.
Figure 10:
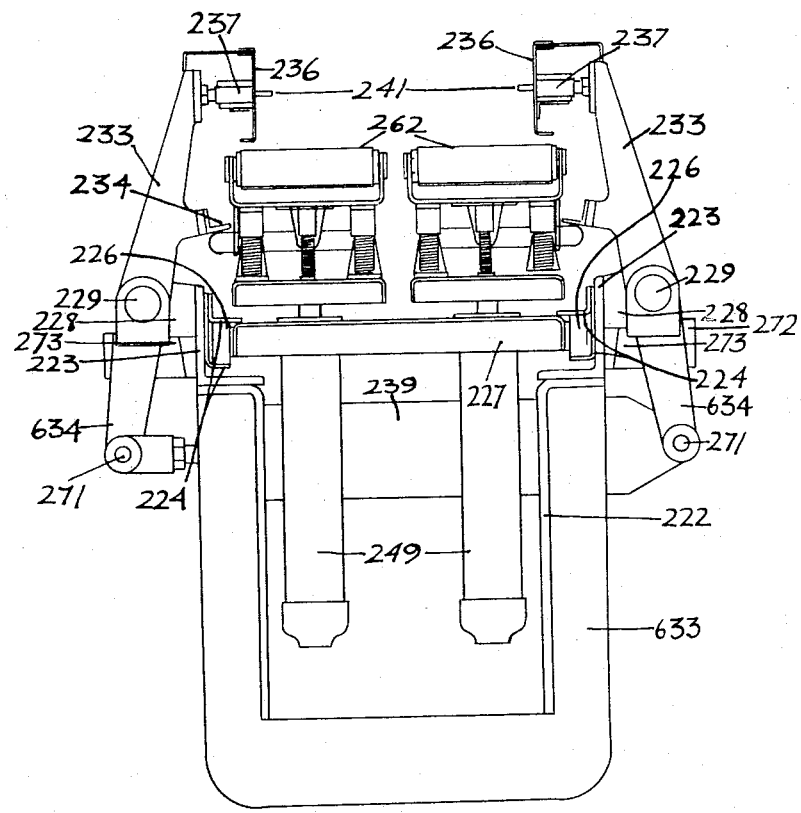
FIGURE 10 is a section on the line A—A of FIGURE 8 viewed in the direction of the arrows.

The bricks, after passing the clamp station, go to the pick-up station where they are aligned and selected for transfer by the pick-up head. The pick-up station is shown in FIGURES 8 to 10, its main structure comprising side plates 222 and stiffening members 633 connected to side angle members 223 which themselves are carried by the main supports of the apparatus and which have angle brackets 224 so mounted as to support rollers 226 carrying carriages 227. The side angle members 223 also have on their outer side lugs 228 interconnected by guide rods 229 passing through, and rotatable in them. The guide rods 229 are located by the corresponding lugs 293 on brackets at the forward end of the pick-up station. On the guide rods 229 are pinch fitted further collars 232 of side guides comprising guide supports 233, inwardly projecting brake-operating members 234, guide plates 236, and micro switches 237 (LS13 to 26) set on the guide supports with their operating levers 241 projecting through holes 238 in the guide plates 236. Connected to the guide rods 229 at their forward end by pivot pins 271 through levers 634 are the piston rod and cylinder of a double acting horizontally positioned pneumatic cylinder 239. Thus when the cylinder 239 expands and retracts the side guides pivot about the guide rods 229 to move the guide plates 236 to and from their "up" or operative position as shown in the figures, to and from their "down" or withdrawn position. Members 272 having a wedge shaped slot through which the levers 634 pass are provided to limit movement of the levers 634 and hence the guide rods and guide supports and plates.

Figure 11:
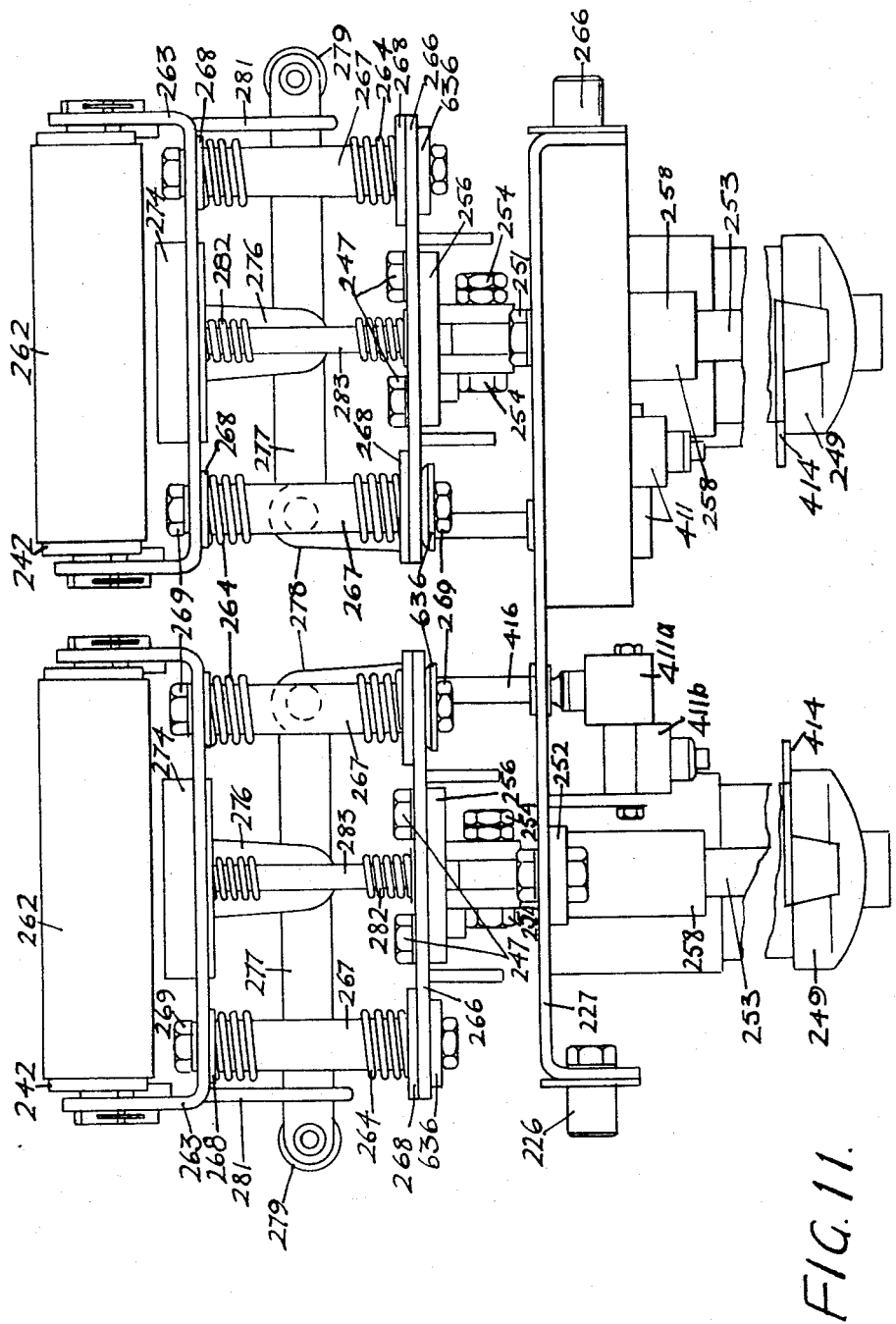
FIGURE 11 is an enlarged detail of the pick-up tables of FIGURE 10.
Figure 12:
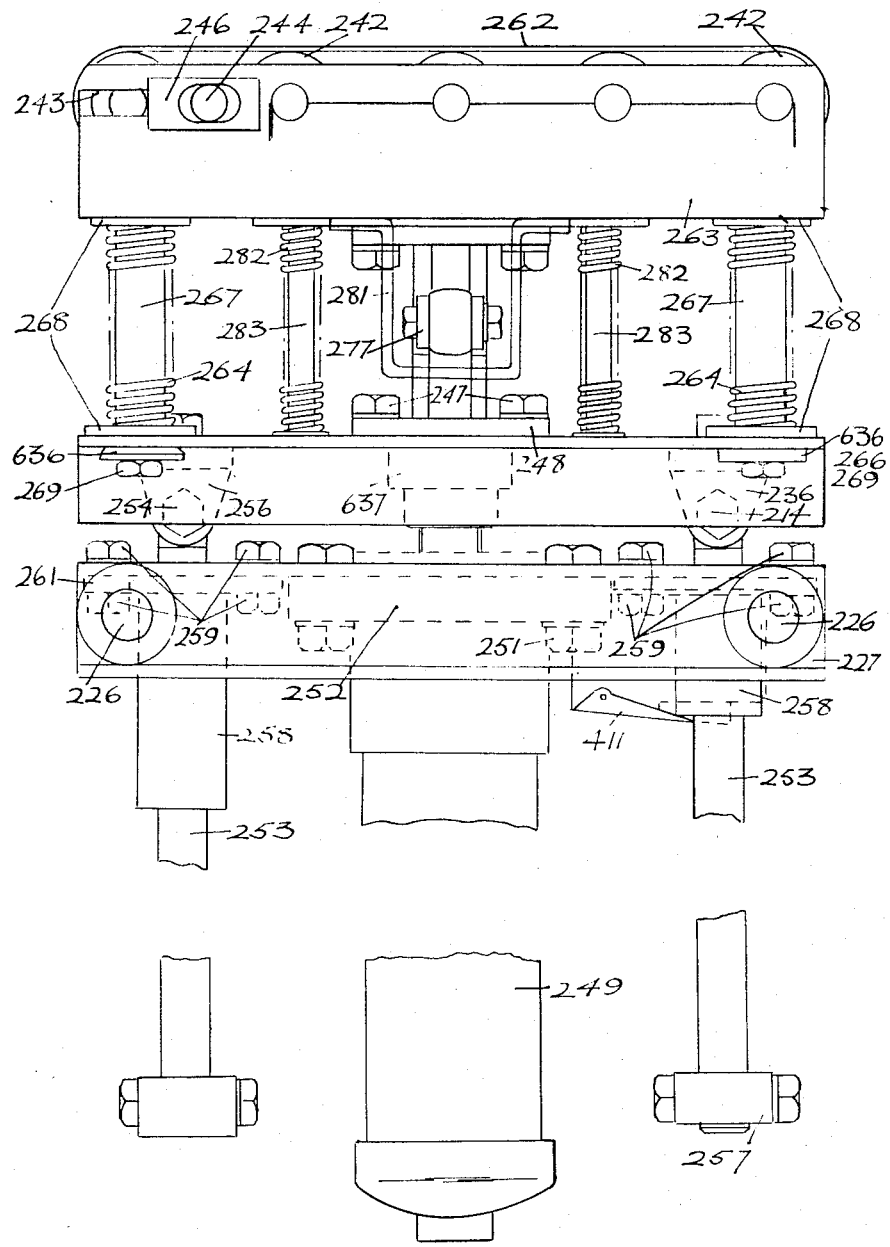
FIGURE 12 is a side view of the pick-up tables of FIGURE 11.

The carriages 227 carry sixteen pick-up tables arranged in pairs. Each pick-up table comprises rollers 242 supporting an endless belt 262 and rotatably mounted in the arms of a channel member 263 which is itself resiliently mounted by springs 264 on a table support plate 266. The springs are positioned by guides 267 secured to channel member 263 by nuts 269 and passing through oversize holes in the table support plate 266 and face on to washers 268, the springs being restrained by the nuts 269 in the ends of the guides. The guides 267 are stabilised and located in the oversize holes by collars 636. The pick-up tables and their supports can most readily be seen in FIGURES 11 and 12. Each channel member 263 is also provided with slots 243 against which are bolted, by bolts 244, plates 246 which can thus be adjusted along the length of the slot, and, by bearing on the end roller 242 are used to keep the belt 262 taut.

The table support plates 266 are not directly mounted on the carriages 227 but are connected by nuts 637, welded to their underside, to the piston rod of the pneumatic double acting cylinder 249 which extends downwards through a bore in the carriage 227, the cylinder being connected by bolts 251 and flange 252 to the carriage. The carriage has further bores through which pass guides 253 bolted at their upper ends by bolts 254 to brackets 256 fitted on the lower surface of the table support plates 266, and terminated at their lower ends with stop members 257, and passing through the bores and through sleeves 258 which are themselves connected by bolts 259 and flange plates 261 to the underside of the carriage.

Thus when the double acting cylinder 249 is expanded the table support plate 266 and hence the tables supported thereon are lifted upwards, the carriages 227 remaining unmoved and when the cylinder is retracted the tables reassume the position shown in FIGURES 8 to 12.

The rollers 242 are idler rollers so that the pick-up tables will offer no resistance to the passage of bricks during the filling of the pick-up station. Also, during the filling of the pick-up station it is desirable for the lateral distance between adjacent bricks to be increased so that they will not rub one against the other. On the other hand, when the bricks are in position on the pick-up tables they should be steady and their top faces should be offered in a horizontal disposition.

In order to achieve steadiness of the tables, each table is fitted with a brake. This comprises a horizontal brake pad 274 adjacent the belt 262 on the underside of the pick-up table and projecting through a slot in the channel member 263. The brake pad is mounted on a bracket 276 connected to a brake operating lever 277 pivoted at one end to bracket 278 mounted by flange 248 and bolts 247 on the table support plate 266 and projecting at its other end, which terminates in a roller 279, towards the side guide support 233. The brake operating lever is also adjacent member 281 which is connected to the outer edge of the underside of the channel member 263. The brake pads are urged upwards by springs 282, on guide pins 283, which pins are welded at their upper ends to them. The springs 282 facing at their upper ends on to the brake pads and, at their lower ends to the table support plates 266. The guide pins pass through a clearance hole in the support plates. Thus when the side guide is "up" the brake operating member 234 abuts against the roller 279 and urges the brake operating lever, the brake pad, and, by means of member 281 the outside edge of channel 263, downwards thus freeing the belt 262 and roller 242 and tilting the tables so as to increase the clearance between laterally adjacent tables allowing the pick-up station to be filled with bricks. Then, when the guides are "down" the brake operating member 234 is not in contact with the roll 279 and the brake pad 274 is urged upwards by the springs 282 and brakes the table, which at the same time is allowed to resume its normally horizontal position.

Each pick-up table is provided with limit switches 411a (LS58 to 73) and 411b (LS37 to 52) bolted together on a bracket 413 by bolt 412, which switches are operated by members 414 and 416 when the tables are "up" and "down" respectively.

The individual carriages 227 which extend beneath two laterally adjacent pick-up tables are interconnected by a series of plates 638 (FIGURE 9), the system of connection being well known in itself. In this system each plate is loosely bolted to the under-surfaces of adjacent carriages the bolts running through longitudinal slots in the plates. In this way the carriages can be moved apart, the bolts attaching them to the plates being slidable along the slots. This system is used because when the bricks are offered for pick-up by the pick-up head the pick-up tables should be "open." This means that the longitudinal distance between adjacent tables is increased. This increase is effected by a double acting pneumatic cylinder 284 (shown in FIGURE 9) which is connected to the forward end carriages 227 by a tie-rod 286. The rear carriage 227 is slidably connecting to a cross member 287 at the feed end of the pick-up station by a tie rod 288 the extent of movement allowed (X) being determined by the distance between nuts 639 on the tie rod. Thus when the cylinder 284 is retracted, tie rod 286 pulls the forward end carriage 227 and the carriages move the distance X plus the total length of slots in the plates 638 preceding the carriage in question, the carriages thus being slightly "opened."

When the bricks are fed to the pick-up station the forward brick is prevented from over-running the forward end pick-up table by stop plate 291 mounted on stop support 289 itself anchored to the forward end carriage 227. This stop plate 291 is fitted with two microswitches 292 (LS11 and 12); one for each train of bricks on the pick-up station. The presence of the bricks, on the forward end pick-up tables and remaining pick-up tables is detected by micro-switches 292 and 237 respectively, all the micro-switches together thus indicating whether or not the pick-up station is full of bricks.

Figure 13:
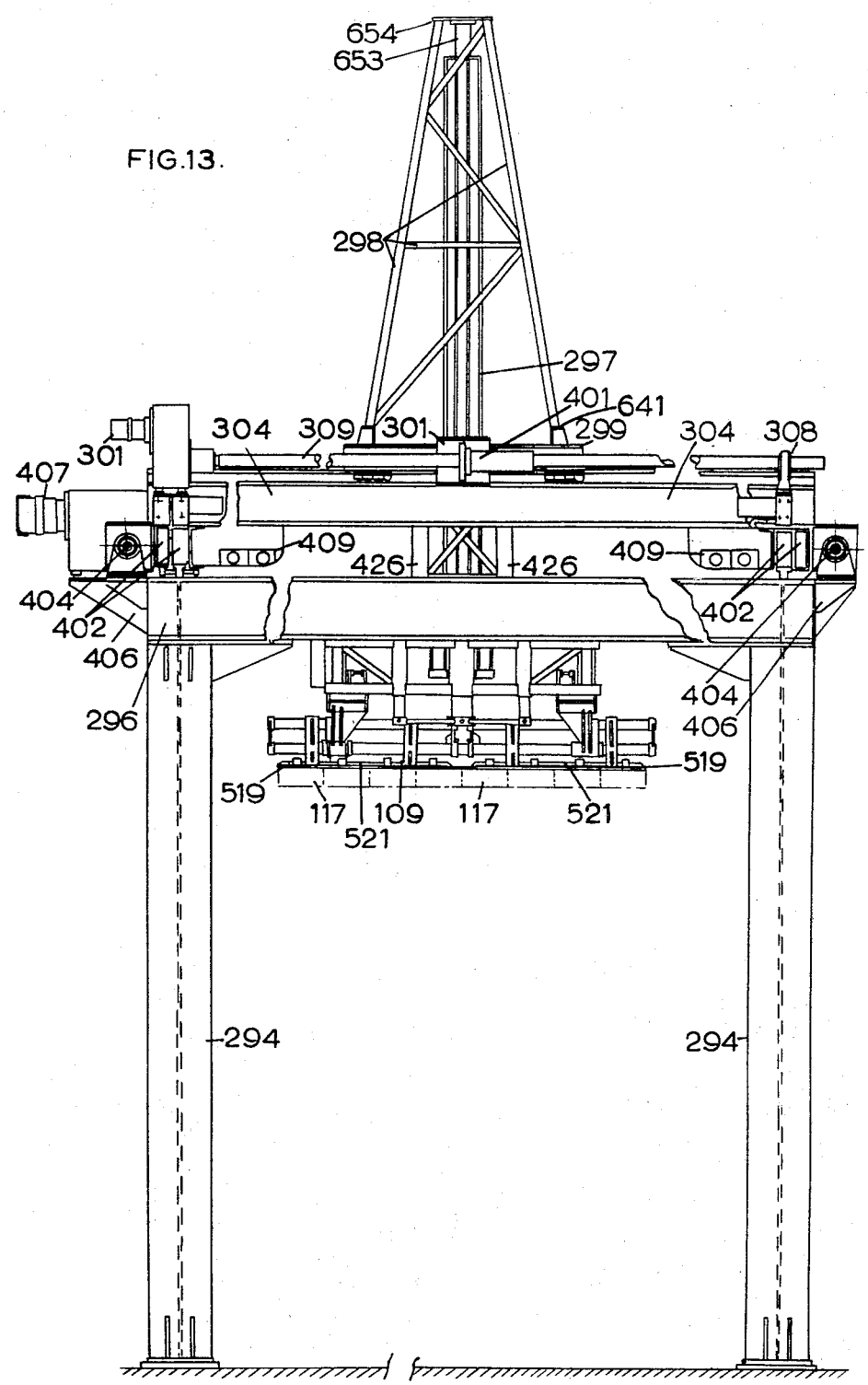
FIGURE 13 is a side elevation of the gantry and pick-up assembly of the apparatus of FIGURE 1 with the pick-up head aligned with the pick-up station.
Figure 14:
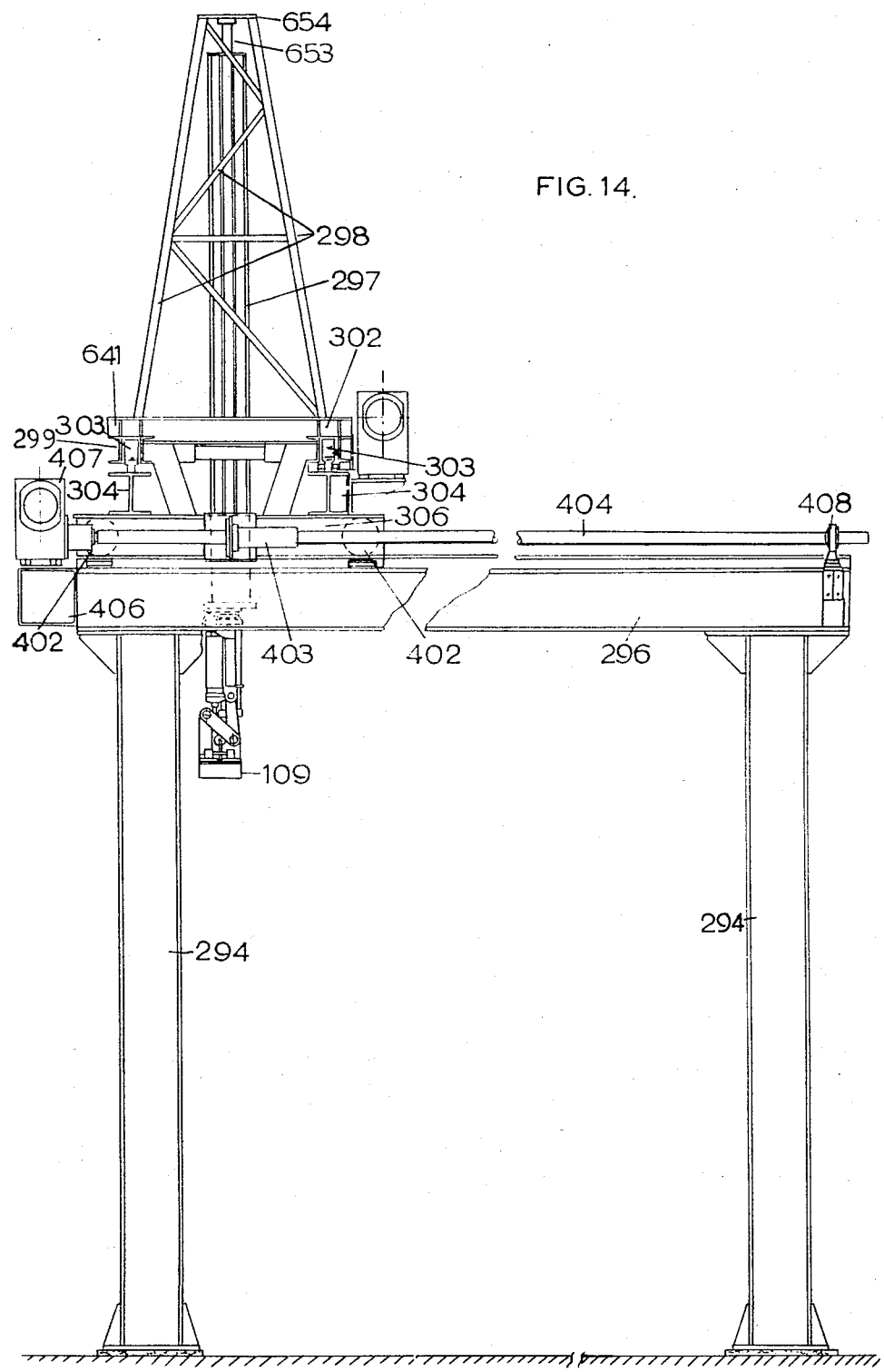
FIGURE 14 is an end elevation of the gantry and pick-up assembly of FIGURE 13.

The pick-up head which is generally indicated at 109 will be described in greater detail with reference to FIGURES 15 to 17. Referring to FIGURES 13 and 14, the pick-up head assembly is mounted on four vertical girders 294 and four horizontal girders 296 arranged in a gantry formation. The pick-up head 109 is mounted at the lower end of a vertical member generally indicated by 297. It is mounted within a lattice of struts 298 having as their base members longitudinal girders 299 and lateral girders 641. The girders are mounted by rollers 303 on longitudinal girders 304 which themselves are mounted on lateral girders 306. The lateral girders 641 have an internally threaded sleeve 401 in engagement with a ball lead screw 309 which is supported on the longitudinal girder 304 at one end by bracket 308 and at its other end connected to hydraulic motor 301. By this arrangement when the hydraulic motor 301 rotates the ball lead screw 309 the sleeve and therefore the pick-up head associated with it travels in a longitudinal direction.

Similarly the lateral girder 306 is borne by rollers 402 on the horizontal lateral girder 296. Lateral girder 306 has an internally threaded sleeve 403 engaging ball lead screw 404 which is mounted at one of its ends through hydraulic motor 407 on an extension 406 of the lateral horizontal girder 296 and at its other end by bracket 408 on lateral horizontal girder 296. By this arrangement when screw 404 is rotated by motor 407 the sleeve 403, and the pick-up head associated with it travels in a lateral direction. To facilitate smooth travel of the pick-up head assembly in the lateral direction counterparts to the rollers 402, sleeve 403, screw 404, girder extension 406 and bracket 408 are provided on the corresponding horizontal lateral girder 296 at the other side of the gantry arrangement. End stops 409 are provided on the structure on which the pick-up assembly travels in order to limit in emergency, the longitudinal or "travel" movement and lateral or "cross" movement of the pick-up assembly. Thus the girders 299 and 641 together with the sleeve 401 are known as the "travel" carriage, and the girders 304 and 306 and the sleeve 403 are known as the "cross" carriage.

The pick-up head 109 is carried by the central member 297. Referring to FIGURES 13, 14, 15, 16 and 17A, the member 297 comprises a central single-acting hydraulic cylinder (not shown) pivotably connected by adaptor 653 to the top plate 654 of the lattice structure 298. The cylinder is co-axial with an external tube 656 fitted with corner-pieces 657 so positioned as to give the composite tube assembly a substantially square cross-section. The composite tube assembly is guided within the girders 641 and 299 by rollers (not shown) bearing on the corner-pieces 657 and carried on the base members and at the apex of a truncated prism-shaped girder assembly 426 attached to girders 641 and 299.

The lower end of the piston rod 658 of the cylinder is attached to a bearing housing 659 and prevented from rotation relative to it by keep-plate 661. The bearing housing 659 terminates in a flange 528 and the external tube 656 is fitted over it and has its own flange 522.

Figure 15:
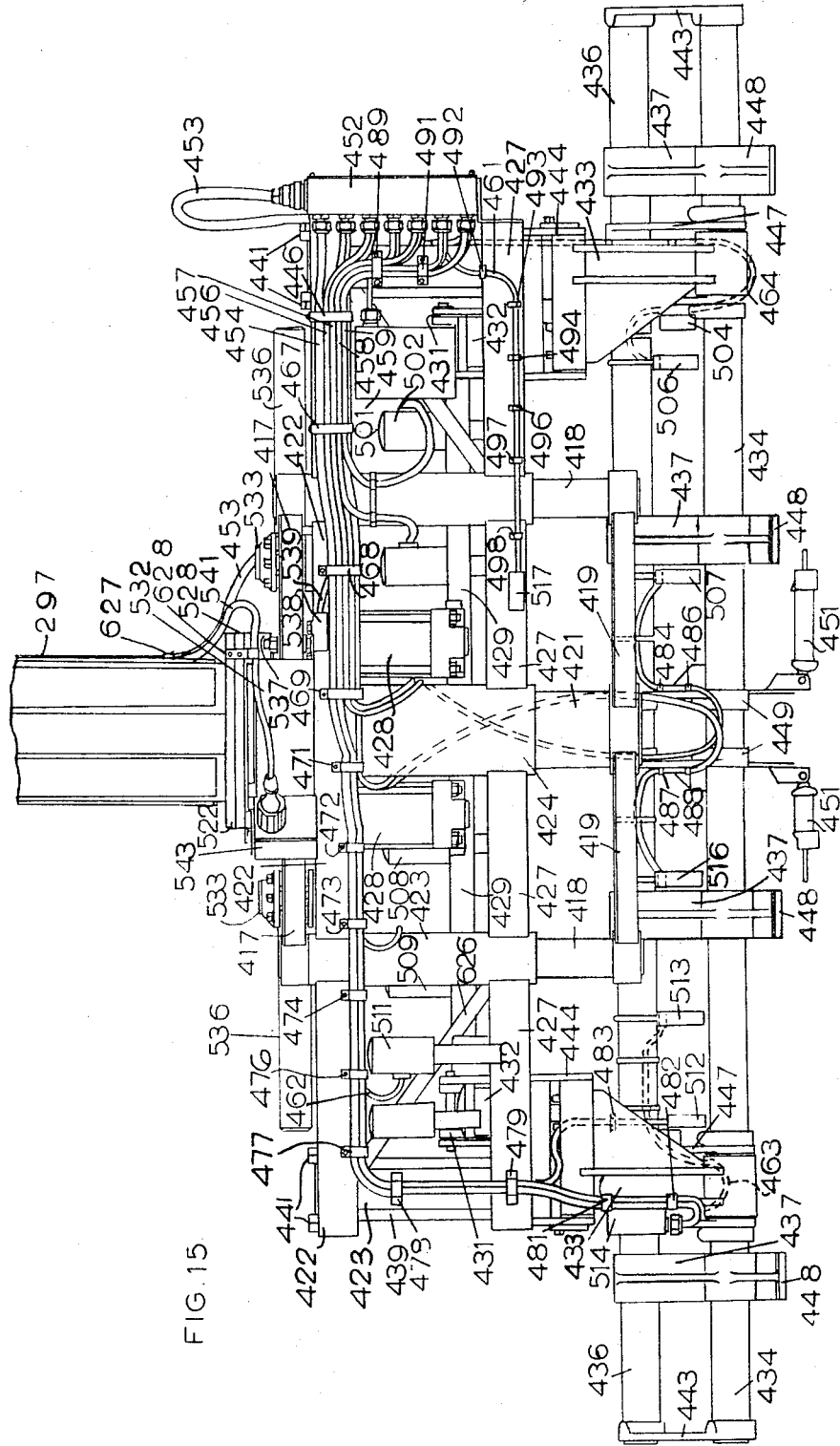
FIGURE 15 is a side elevation of the pick-up head of FIGURE 1 with the pick-up plates removed.
Figure 16:
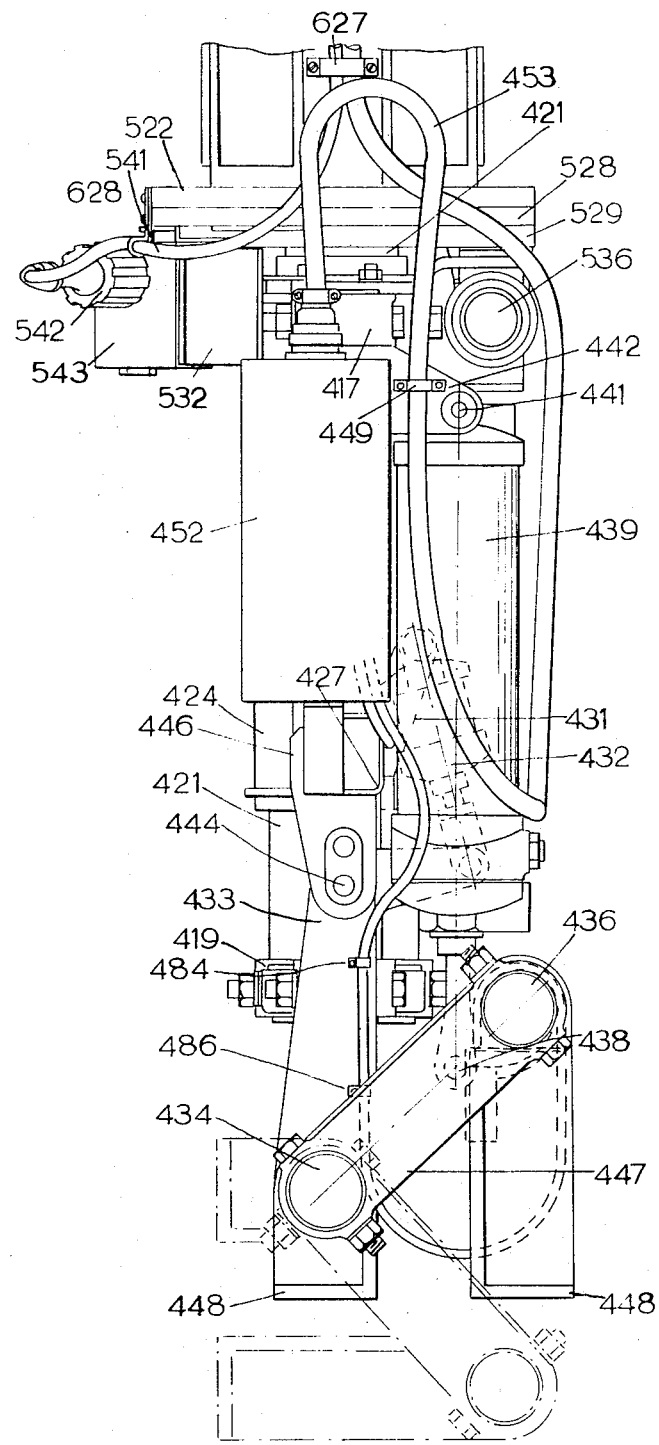
FIGURE 16 is an end elevation of the pick-up head of FIGURE 15 with the pick-up plates removed.

Referring now to FIGURES 15 and 16, the pick-up head comprises a main frame assembly comprising members 417, 418, 419 and 421. This carries a movable frame assembly comprising members 422, 423, 424 and 626.

The movable frame assembly is moved along members 418 and 421 of the main frame assembly by "creep cylinders" 428, mounted between member 422 of the movable frame assembly and member 417 of the main frame assembly. Thus when the "creep" cylinders are expanded and retracted the movable frame assembly, and the parts associated therewith, moves vertically with respect to the main frame assembly. Also pivotally carried by pivot 431 on member 427 are "tilt" cylinders 432 which at their other end, through bell crank 433, carry guide tube 434 which in turn carries guide tube 436 by brackets 447, 449 and end brackets 443. Brackets 447 are pivotally connected by pivot 438 to one of the ends of two "twist" cylinders 439 each of which is pivotally connected by pivot 441 and bracket 442 to the member 422 of the movable frame assembly. Thus when the "tilt" cylinders 432 expand and retract the guide tube assembly, including guide tubes 434 and 436, rotate or "tilt" about pivots 444, on bell cranks 433, which connect the bell-cranks by plates 446 to members 427 of the movable frame assembly, the twist cylinders 439 rotating slightly about pivot 441. Furthermore, for a given position of "tilt," when the twist cylinders are expanded the guide tube assembly rotates about the longitudinal axis of guide tube 434 to the position shown in dotted line in FIGURE 16.

Figure 17A:
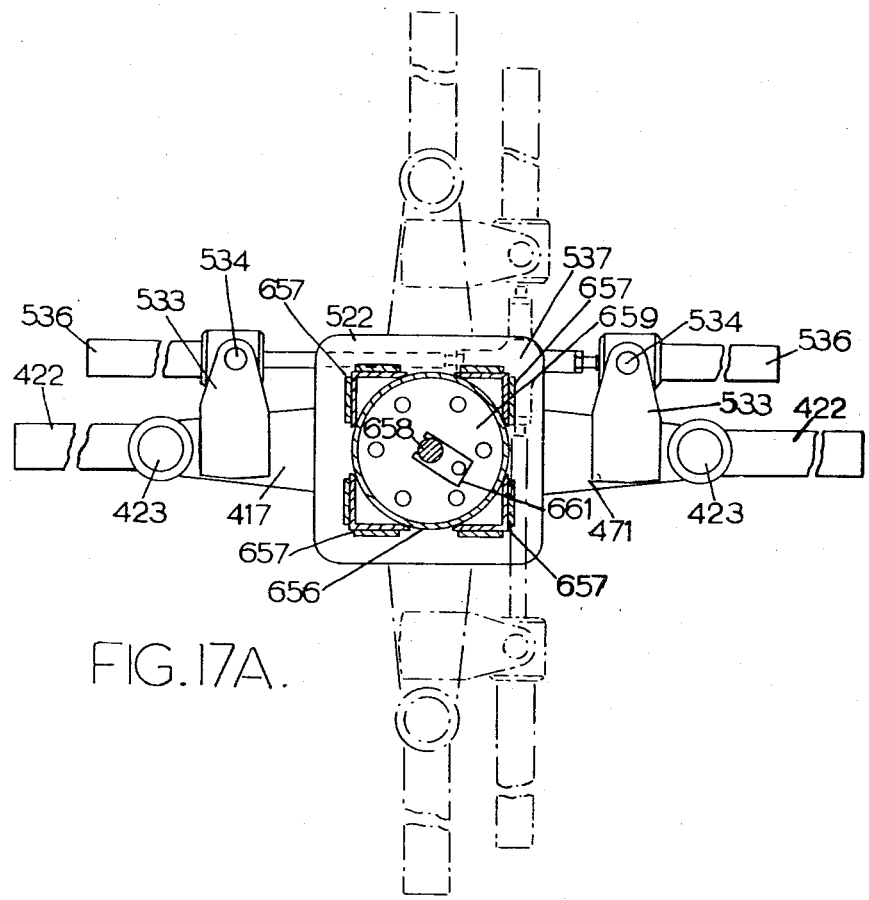
FIGURE 17A is a cross-sectional detail plan of the support member for the pick-up head.
Figure 17B:
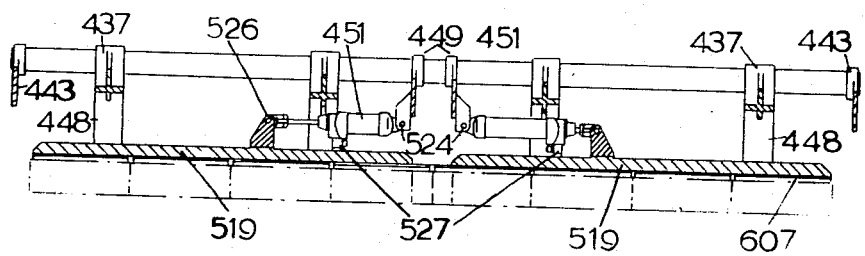
FIGURE 17B is a detailed side view of the pick-up plates of the apparatus.
Figure 19:
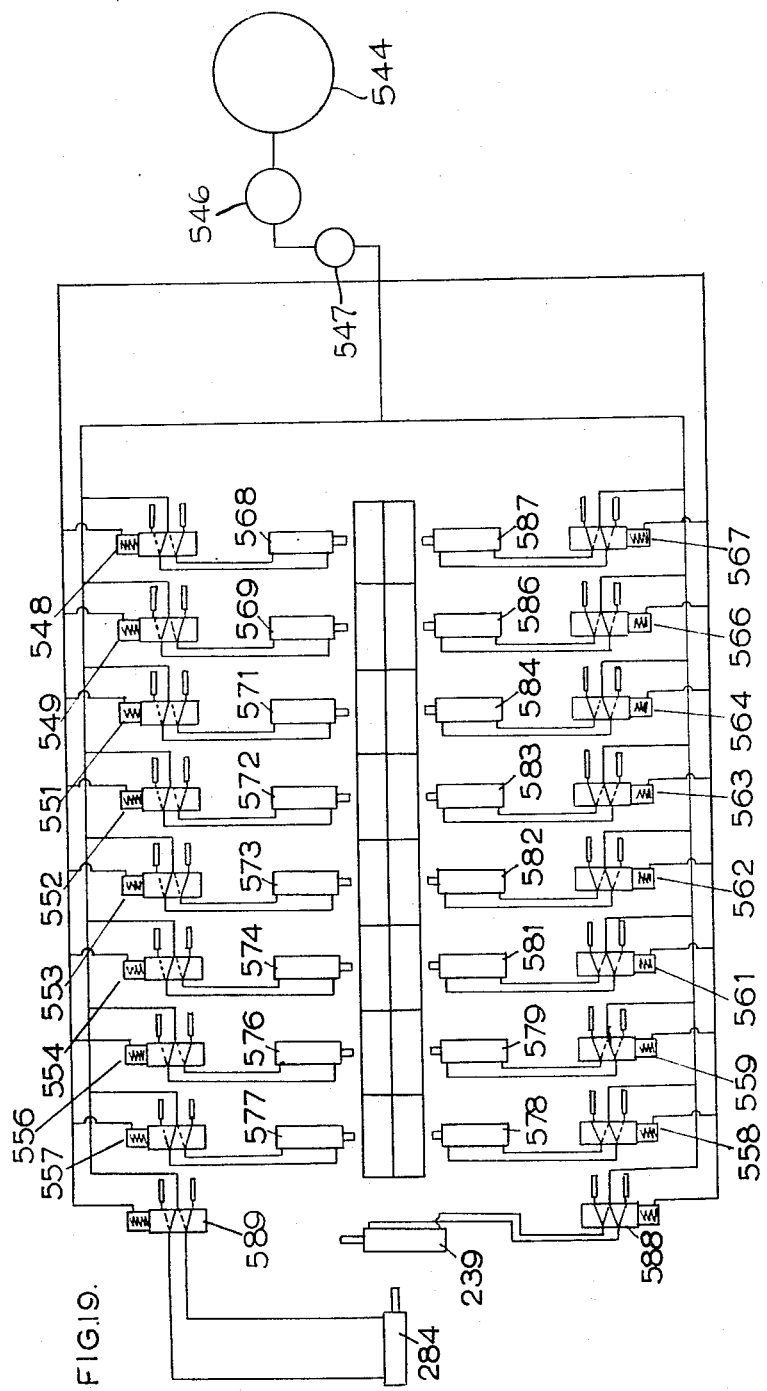
FIGURE 19 is a schematic diagram showing the pneumatic system of the pick-up station of FIGURE 8.
Figure 20:
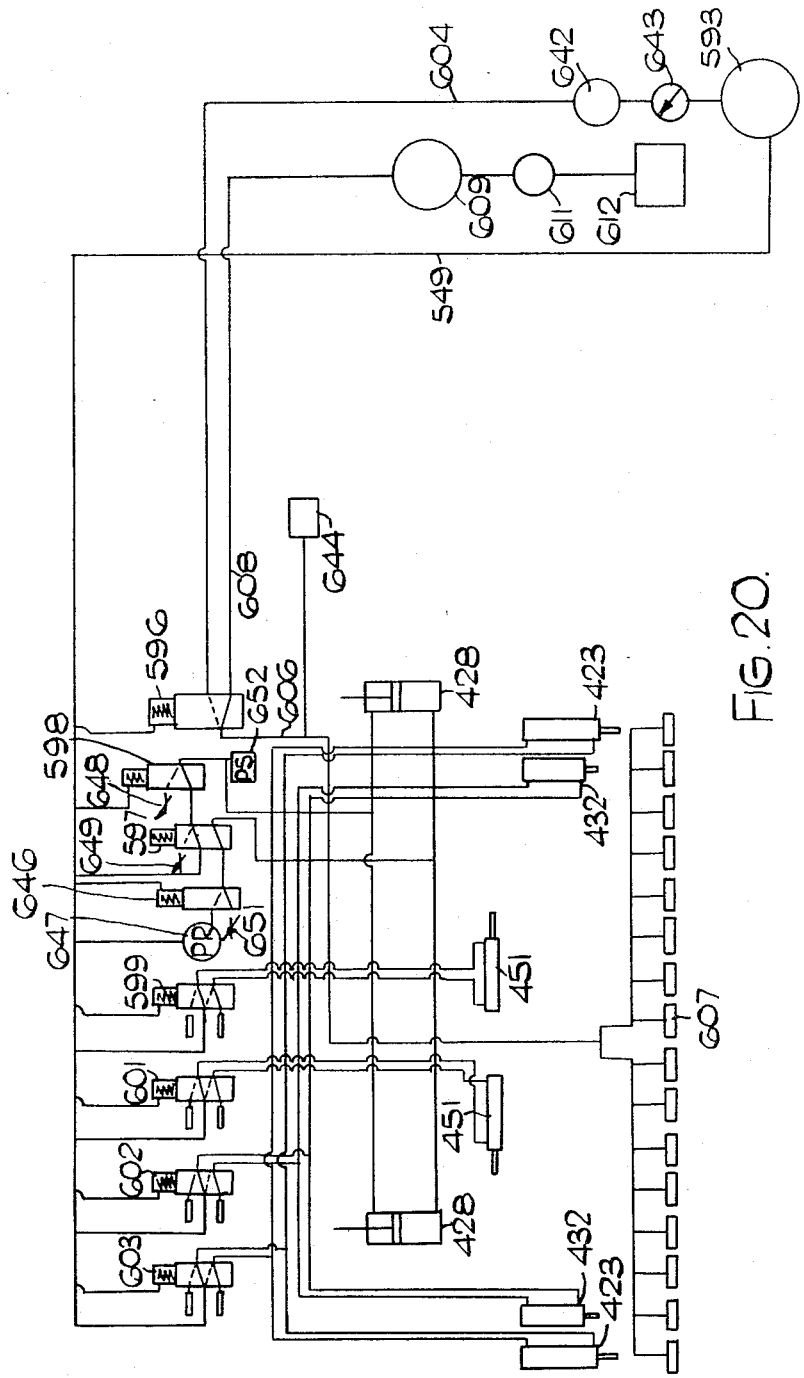
FIGURE 20 is a schematic diagram showing the pneumatic system of the pick-up head of FIGURE 15.

Further brackets 437 are provided on, and are slidable along, the guide tubes 434 and 436 and they each carry an extension 448 to which are bolted pick-up plates 519 and their associated vacuum lines 521 shown in FIGURES 13 and 17B.

In short the pick-up plate assembly comprises two pick-up plates 519 each carrying four pairs of pick-up pads 607. Vacuum is applied when each pad is applied to a brick through a groove in the pad which opened by a flap valve (not shown) contacting the brick.

The guide tubes 434 and 436 are also interconnected by brackets 449 which cannot slide along the tubes. Between each bracket 449 and a bracket 523 on each plate 519 is mounted, by pivots 524 and 526 respectively a double-acting pneumatic "split" cylinder 451. The shell of each split cylinder has air supply connection 527. Thus when these cylinders are expanded the plates 519 move outwards from the centre of the pick-up head as seen in FIGURES 15 and 17B, the plates being guided by the brackets 437. This movement of the plates is known as "split," and the two split cylinders can be independently operated to give movements known as "Split A" and "Split B."

Also indicated on FIGURES 15 and 16 are various solenoid valves, limit switches and pressure switch. These are electrically connected to junction box 452 and thereby to the main electrical cable 453, secured by clip 627 by wires 454, 456, 457, 458, 459, 461, 462, 463, 464 and 539 in a manner fully described hereinafter with relation to the relay system. These wires are variously held in position on the structural members of the pick-up head by clips 466, 467, 468, 469, 471, 472, 473, 474, 476, 477, 478, 479, 481, 482, 483, 484, 486, 487, 488, 489, 491, 492, 493, 494, 496, 497, 498, 499 and 518 as shown in FIGURES 15 and 16. The reference numerals indicate the pressure switch, solenoid valves and limit switches, whose functions are also explained hereinafter with reference to the relay system, as follows:

| Reference numeral: | Item |
|---|---|
| 501 | PS1 |
| 502 | SV3 |
| 503 | SV23 |
| 504 | LS58 |
| 506 | LS7 |
| 507 | LS35 |
| 508 | SV1 |
| 509 | SV6 |
| 511 | SV35 |
| 512 | LS2 |
| 513 | LS6 |
| 514 | LS1 |
| 516 | LS34 |
| 517 | LS10 |
| 538 | LS31 |

Now reverting to the manner in which the pick-up head 109 is mounted to the lattice of struts 298 by member 297 herein before described, and referring to FIGURES 15 to 17A, member 421 of the main frame assembly hangs in taper roller bearings (not shown) of the bearing housing 659. Thus when the cylinder connected to bearing housing 659 is expanded and retracted the pick-up head 109 is moved vertically. This is the movement known as "lower."

Provision is also made for the main frame assembly to be rotated about the axis of member 297. A flange 522 which is bolted through seal 528 to flange 529 on tubular member 531 around which a cylindrical member 532 carrying the main frame assembly can rotate. Hingedly bracketed to member 417 by brackets 533 having hinge pins 534 are single acting hydraulic "rotate" cylinders 536 whose piston rods are connected at a pivot point 537 eccentric to the axis of cylindrical member 421 as shown in FIGURE 17A so that expansion and retraction of the "rotate" cylinders causes the main frame assembly and hence the pick-up head to rotate about a vertical axis through member 297 and member 421 of the main frame assembly.

FIGURE 15 also shows the electric wire 541 secured by clip 628 leading to plug pin 542 of limit switch box 543 the switches of which follow and are actuated by the profile of cams, generally indicated at 532, which are secured to, and rotate with member 417.

It will be appreciated in the following description of the pneumatic systems of the conveyors, clamps and pick-up station that similar but independant pneumatic systems are applied to each train of the conveyors, each clamp and each line of pick-up tables. Thus each train of bricks through the apparatus can be independently controlled.

FIGURE 18 shows the pneumatic system applied to the singulator-accumulator conveyor, to the accumulator conveyor.

Reference will now be made to FIGURES 21–36 inclusive of the accompanying drawings which are circuit diagrams of the relay systems controlling the operation of the machine in conjunction with the electronic and punched tape system hereinafter described. In the following description various abbreviations are used as follows.

RY=relay
LS=limit switch
PS=pressure switch
SV=solenoid valve and also of course conventional symbols.

It will immediately be apparent that in the following description not all the components and connections shown in the circuits are positively referred to but only those which are an integral part of the inventive concept of the system. The components not specifically referred to are either a conventional integral part of any such type of circuit as will be readily appreciated by those skilled in the art or alternatively are present for purposes, such as safety, extraneous to the basic inventive concept and as such not forming part of the invention hereinafter claimed.

The various figures details of which are given below are also referred to as "Panels" where in one circuit the connection to another is shown and the equivalent Panel Nos. are given in parentheses.

Figure 21A:
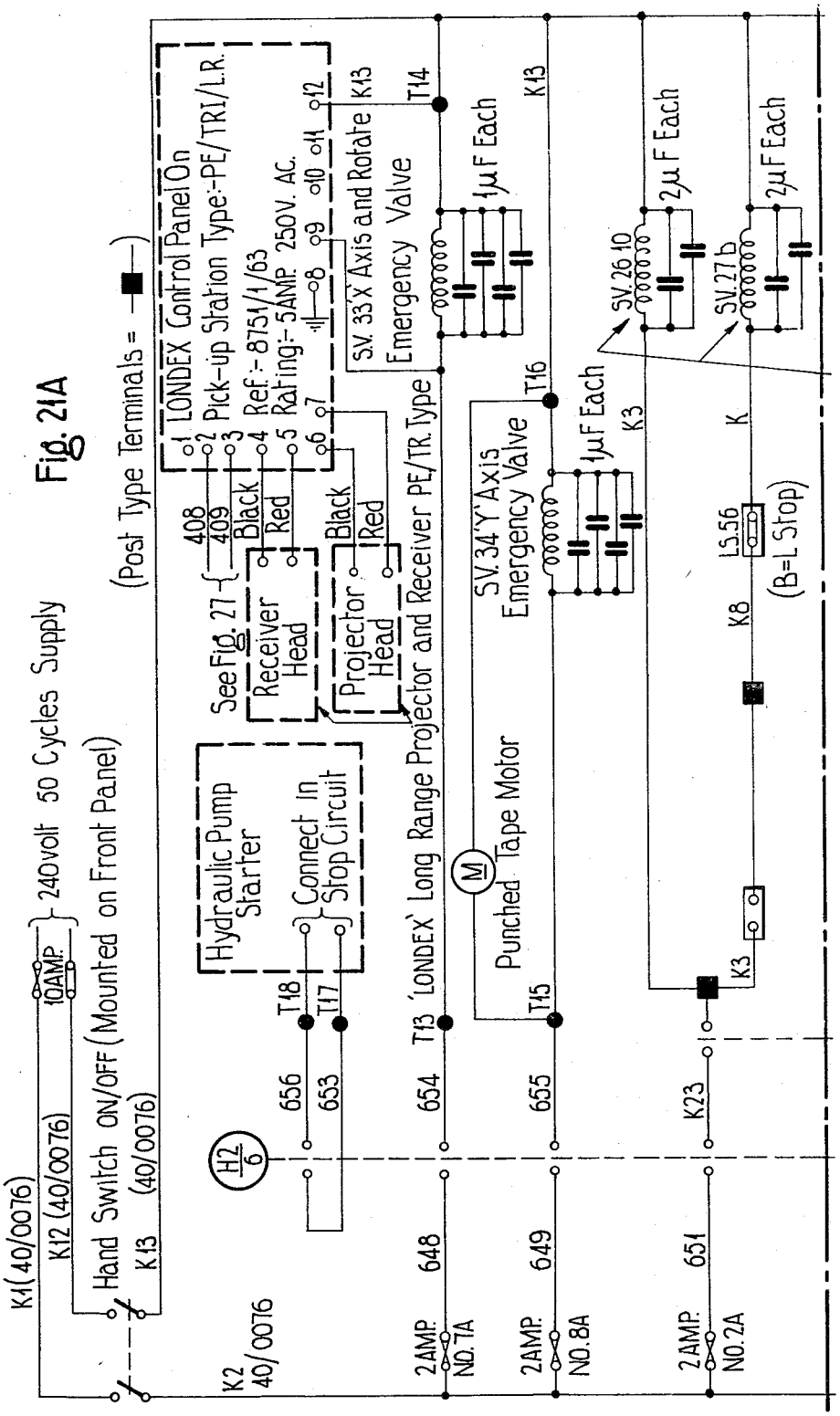
FIGURE 21 shows the interposing relay circuit for switching A.C. onto the contacts in the relay system of the invention.

FIGURE 21 (Panel C) shows the interposing relay circuit for switching A.C. onto the contacts.

Figure 22A:
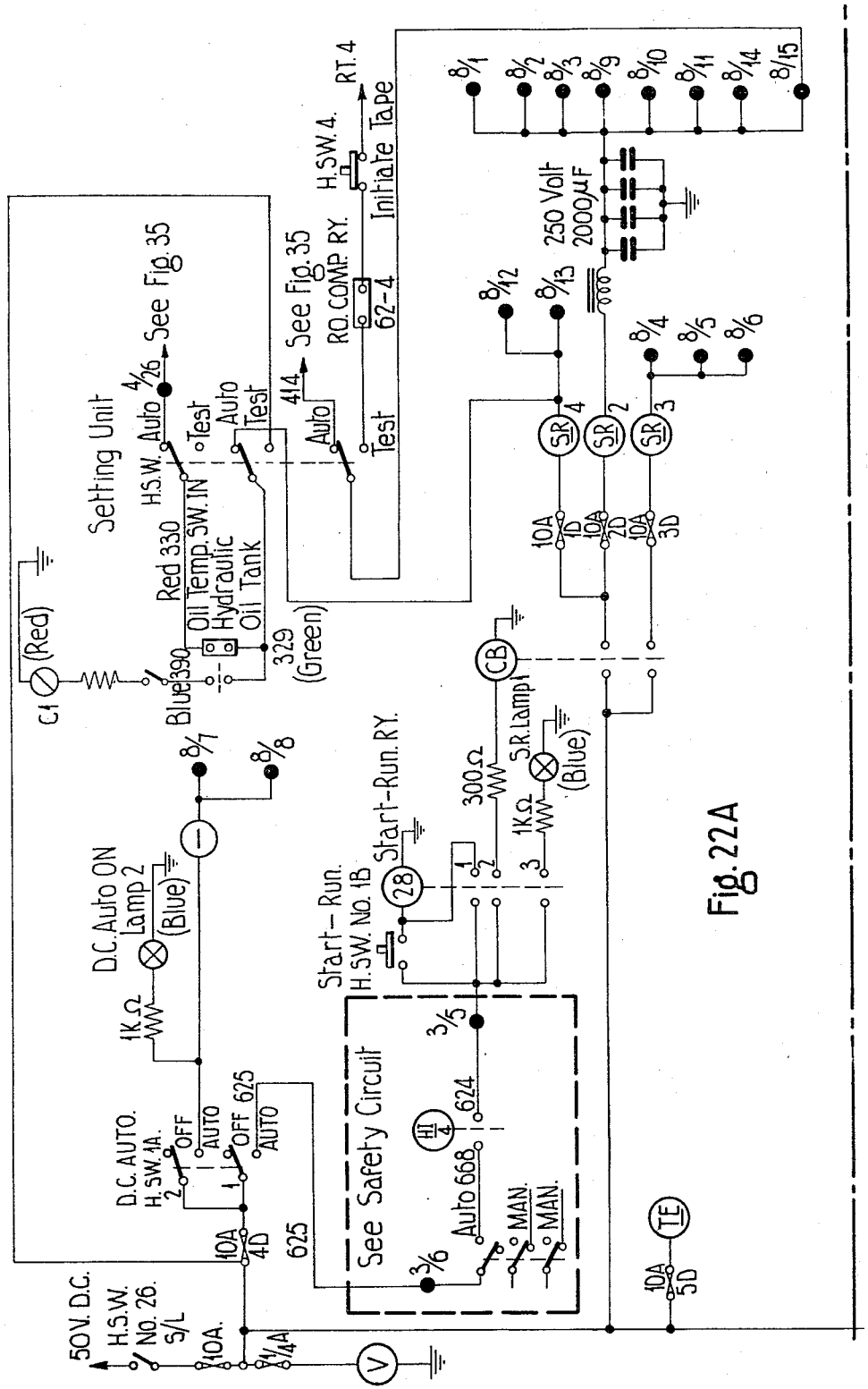
FIGURE 22 illustrates the start circuit for the system.

FIGURE 22 (Panel 7) is the start circuit.

Figure 25A:
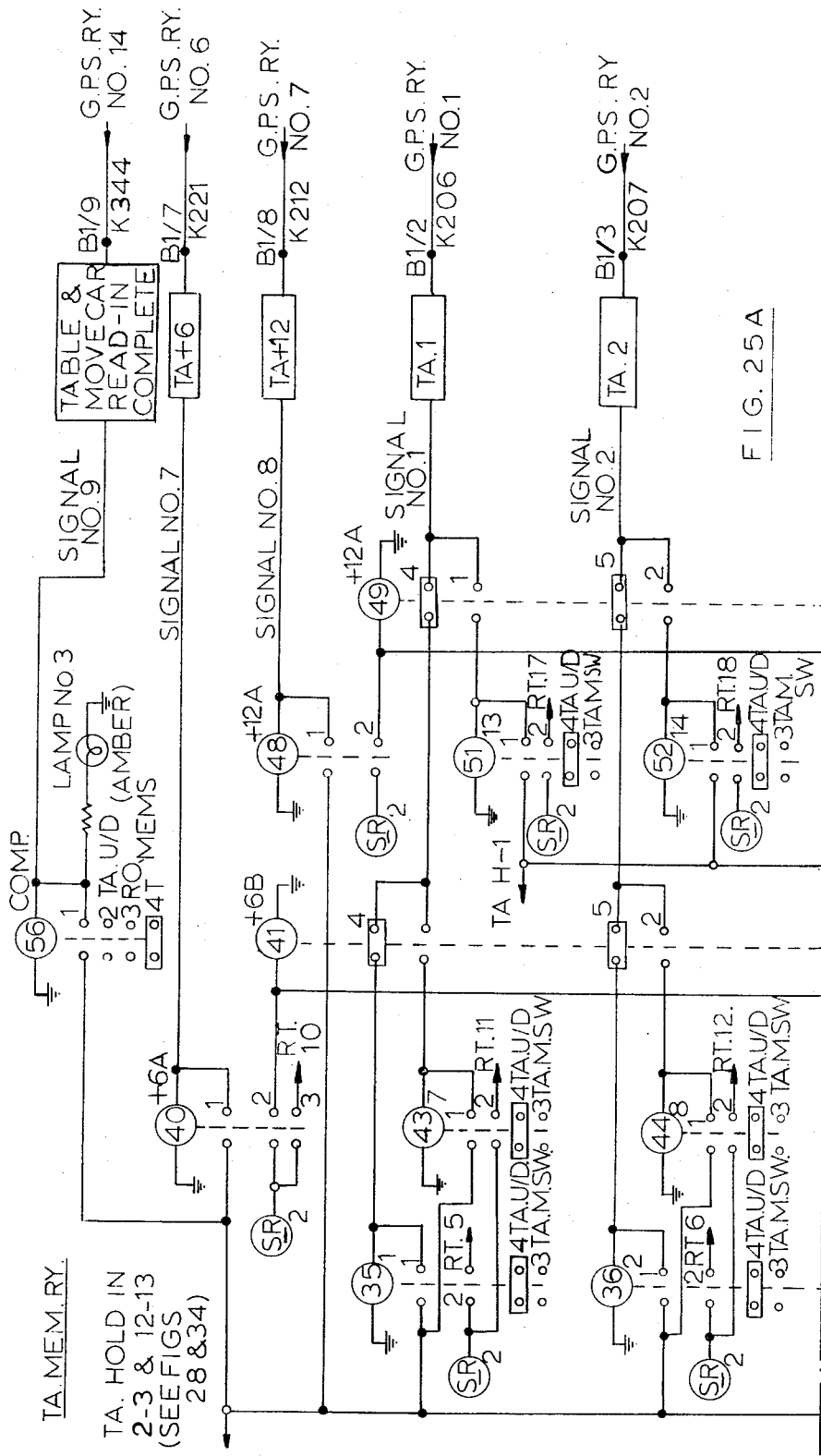
Figure 25B:
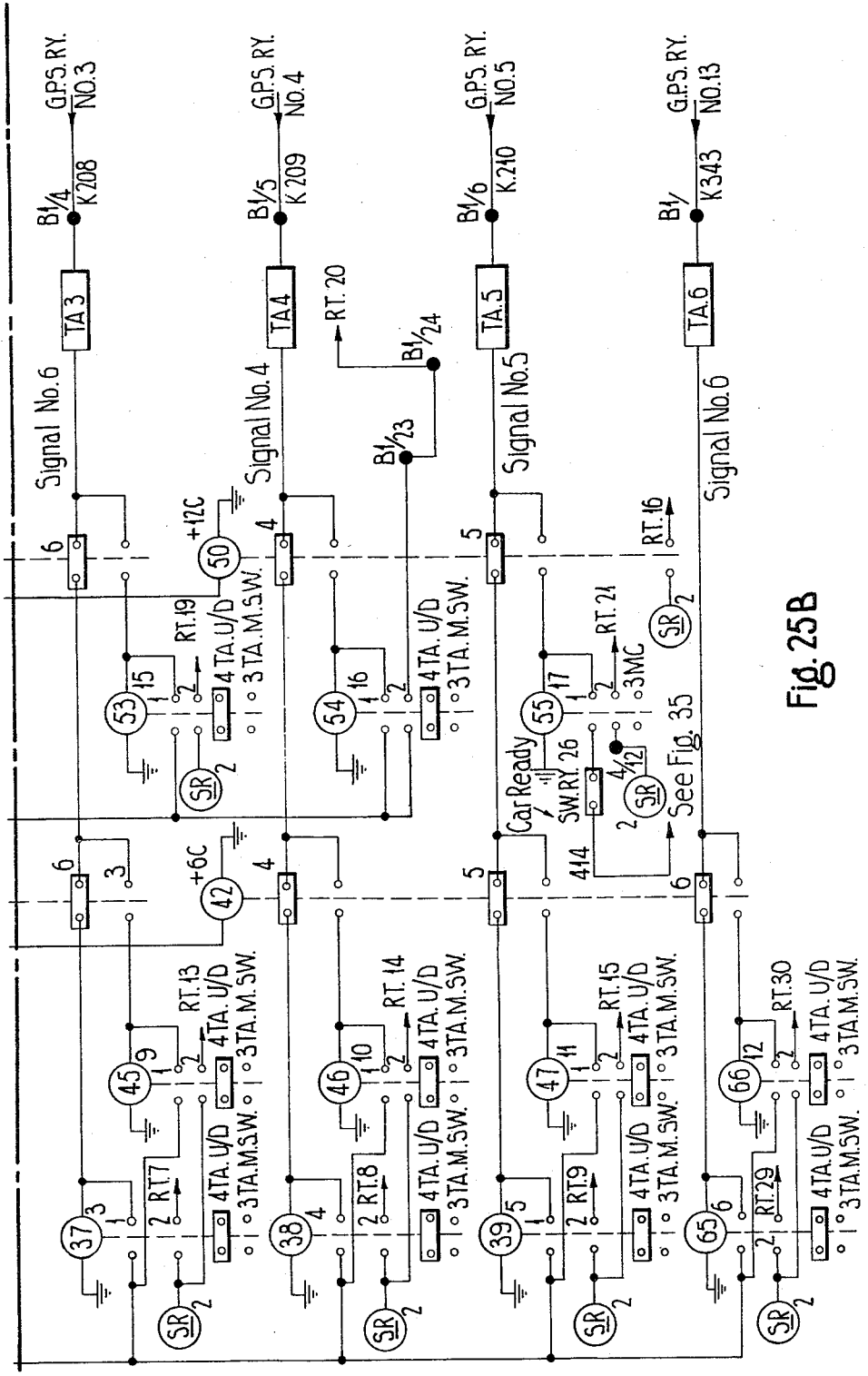

FIGURES 23, 24 and 25 (Panels 8, 9 and 10) are memory relay circuits.

FIGURE 26 (Panel 13) is a further circuit of the table relays and limit switches.

FIGURES 27–35 (Panels 15, 16, 17A, 17B, 18, 19, 20, 21 and 22) show further circuits relating to the operations referred to at the left hand side of the figures.

FIGURE 36 (Panel 24) shows the circuit for the (read-tape) (RT) signals.

Throughout the following description and also in the drawings various symbols such as T for Travel and C for Cross are used. These symbols are explained hereunder under the heading "Condition of machine at start of automatic cycle."

*Condition of machine at start of automatic cycle*

Travel (T), frame at zero, i.e., over pick-up station
Cross (C), frame at zero, i.e., central over pick-up station
Lower (L), column at zero
Rotate (RO), returned
Twist (TW), returned
Tilt (TI), returned
Split A (SPA), returned
Split B (SPB), returned
Creep (CR), returned
Vacuum on
Blow down off
Table (TA) and Move-car (MC) relay memory bank complete RO, TW, SPA and SPB relay memory bank complete
TA up
TA open
Guides down
Clamp A on
Clamp B on

*Relay conditions at start position*

| | |
|---|---|
| Ry1, de-energised | 33 |
| Ry2, 3, and 4, de-energised | 28 |
| Ry5, de-energised | 28 |
| Ry6, de-energised | 29 |
| Ry7, de-energised | 30 |
| Ry8, 9, de-energised | 30 |
| Ry10, *just* energised | 35 |
| Ry11, energised | 31 |
| Ry12, de-energised | 34 |
| Ry13, de-energised | 34 |
| Ry14, energised | 31 |
| Ry15, de-energised | 34 |
| Ry16, de-energised | 34 |
| Ry17, de-energised | 34 |
| Ry18, de-energised | 34 |
| Ry19, energised | 32 |
| Ry20, energised | 32 |
| Ry21, energised | 32 |
| Ry22, energised | 32 |
| Ry23, energised | 31 |
| Ry24, energised | 31 |
| Ry25, energised | 31 |
| Ry26, de-energised | 35 |
| Ry27, de-energised | 35 |
| Ry28, energised | 22 and 27 |
| Ry29, energised | 27 |
| Ry30, energised | 31 |
| Ry31, de-energised | 33 |
| Ry32, energised | 27 |
| Ry33, de-energised | 26 |
| Ry34, energised | 36 |
| Ry35, 36, 37, 38, 39, de-energised | 25 and 26 |
| Ry40, 41, 42, de-energised | 25 |
| Ry43, 44, 45, 46, 47, de-energised | 25 and 26 |
| Ry48, 49, 50, de-energised | 25 |
| Ry51, 52, 53, 54, de-energised | 25 and 26 |
| Ry55, de-energised | 25 and 35 |
| Ry65, 66, de-energised | 25 and 26 |

*Relay conditions at start position—Continued*

| | |
|---|---|
| Ry56, energised | 25 |
| Ry57, 58, 59, 60, 61, de-energised | 24 |
| Ry62, energised | 24 |
| Ry63, energised | 35 |
| Ry64, de-energised | 31 |
| Ry67, ed-energised | 29 |
| Ry68, de-energised | 29 |
| Ry69, de-energised | 29 |
| Ry70, de-energised | 29 |
| Ry71, de-energised | 29 |
| Ry72, energised | 30 |
| Ry73, de-energised | 29 |
| Ry74, de-energised | 27 |

*Condition of interposing relays (for switching A.C. on contacts at start position)*

| | |
|---|---|
| RyH2, energised (part of safety circuit) | 21 |
| RyA, de-energised | 21 |
| RyB, C, D, and E, de-energised | 21 |

*Control Limit Switches at start position*

| | |
|---|---|
| LS1, closed | 35 |
| LS2, open | 28 |
| LS5 and 5a, open | 28 |
| LS6–9, open | 29 |
| LS10, open | 30 |
| LS11–26, open | 26 and 31 |
| LS27, closed | 31 |
| LS28, 28a, 29, 29a, closed | 31 |
| LS30, closed | 32 |
| LS31, closed | 32 |
| LS32, open | 32 |
| LS33, closed | 35 |
| LS34, 35, closed | 35 |
| LS37–52, closed | 26 |
| LS53, open | 35 |
| LS54, 54a, closed | 27 and 22 |
| LS55, closed | 21 |
| LS56, closed | 21 |
| LS57, open | 21 |
| LS58–73, open | 26 |
| LS75, open | 28 |
| LS76–81, open | 33 |
| LS82, open | 28 |
| LS83, open | 29 |
| LS84, open | 29 |
| LS85, closed | 31 |
| LS209, open. | |
| LS218, open. | |

N.B.: LS209 and 218 are in safety circuit (not shown).

*Condition of Pressure Switches at start position*

| | |
|---|---|
| PS1, open | 30 |
| PS2, closed | 32 |

*Condition of Solenoid Valves at start position*

| | |
|---|---|
| SV1, de-energised | 28 |
| SV2, 3, de-energised | 28 |
| SV4, de-energised | 27 |
| SV5, energised | 27 |
| SV6, de-energised | 30 |
| SV7–22, energised | 27 |
| SV23, de-energised | 28 |
| SV24, de-energised | 30 |
| SV25, de-energised | 30 |
| SV26b, de-energised | 21 |
| SV27a, de-energised | 21 |
| SV27b, de-energised | 21 |
| SV28a, energised | 21 |
| SV28b, de-energised | 21 |
| SV29, 30, de-energised | 33 |
| SV31, 32, de-energised | 22 |
| SV35, de-energised | 30 |

The next operation will be creep down fast because relay contacts 72–3, 10–2, 19–3 and 9–4 are closed. Thus solenoid valve SV6 is energised. The creep up switch LS31 becomes open and Ry21 de-energised. This has no function at all at this stage. Next limit switch LS10 (creep down) closes and thus relays 8 and 9 are energised because of contacts 10–3, 72–2 and LS10 being closed. Contacts 8–1 provide a hold in circuit for both Ry8 and 9 through relay contacts 22.

Relay contacts 9–4 now open and thus solenoid valve SV6 de-energises and creep up occurs. When creep up is complete limit switch LS31 closes and Ry21 is energised. When all the bricks have been removed from the pick-up tables by action of creep up Ry74 becomes energised by a continuous beam of light being sensed by a receiver which indirectly energises Ry74.

The next operation will now occur because relay contacts 74–1, 8–3, 27–6, 21–1, 62–2 and closed change-over contacts of relay Ry2 cause relays Ry2, 3 and 4 to energise. After Ry2 has energised the normally open pair of change-over contacts close and provide a hold-in supply for Ry2, 3 and 4 from relay contacts 9–3. Relay contacts 4–3 now provide signal RT1 which initiates tape.

When Ry2 becomes energised the hold-in circuit for the table memories is broken and Ry56 is energised.

The following actions now occur simultaneously. Twist and tilt occur because relay contacts 3–1, 9–2, 59–4 and 18–4 are closed and thus solenoid valves SV3 and SV23 are energised. Split A and B occurs because relay contacts 3–4, 60–4 and 61–4 are closed and thus solenoid valves SV1 and SV2 are energised. At the commencement of twist, tilt or split A or split B, Ry10 becomes de-energised.

The information read from the tape following the signal RT1 is for the amount of movement required on travel. The information is converted electronically into suitable signals to cause the servo-hydraulics of the travel axis to drive the carriage to the required position. When the read in of this information is complete a signal pulse is received from the positional electronics control on wire K219 and because contacts 4–2 are closed Ry17 becomes energised and because of contacts 17–1 and 3–5 being closed Ry17 is held in.

When split A and split B are complete limit switches LS6 and LS7 are closed and Ry73 becomes energised. Because relay contacts 3–3, 73–1, 57–4 and the contacts of Ry5 are closed, Ry5 becomes energised and because of its normally open change-over contacts which then close Ry5 is held in by relay contacts 2–2.

When the travel carriage commences to move limit switch LS28 opens and Ry23 is de-energised and when it has moved a short distance limit switch 75 closes and being in series with contacts 5–2 thus energises interposing Ry D and this in turn de-energises solenoid valve SV28a and energises solenoid valve SV28 and this causes the head to rotate. As the head rotates limit switch LS33 opens and Ry63 becomes de-energised. Now because relay contacts 3–2, 63–4 and 17–2 are closed signal RT2 is given to initiate tape.

The next batch of information on the tape is for the direction and amount of movement required of the cross carriage. This information is converted electronically into suitable signals to cause the servo-hydraulics of the cross axis to drive the carriage to the required position.

After cross commences limits switch LS29 opens and Ry24 is de-energised.

The above movements continue till all are complete.

When the travel movement is complete the positional equipment gives a pulse signal on wire K220 and Ry12 becomes energised and because of contacts 12–1 and 3–5 being closed Ry12 is held in. When the cross movement is complete the positional equipment gives a pulse signal on wire K221 and Ry15 is energised. Because of contacts 15–1 and 16–4 being closed Ry15 is held in.

During the movement of the travel carriage limit switch LS84 is closed and Ry71 becomes energised. This relay is held in by contacts 71–1 and limit switch LS209 which is closed due to the movement of the travel carriage.

When rotate is complete limit switch LS218 closes and Ry69 becomes energised. Because relay contacts 69–1 and 71–2 are closed Ry67 becomes energised.

When twist, tilt and rotate are all complete limit switches LS8 and LS9 close and now because they are in series with limit switches LS6 and 7 relay contacts 15–2, 27–5, 12–2 and 8–2 which are all closed Ry68 becomes energised and through relay contacts 68–3 signal RT3 initiates tape.

The information on the tape is now for the amount of movement required on lower. When this information has been read in a signal is received at tag number B1/25 and through contacts 67–1 and 68–1 which are closed Ry6 becomes energised and through contacts 6–2, 8–6, and 68–3 Ry6 is held in. Through contacts 6–1 interposing Ry A now becomes energised and through wire K139 a supply is made available to the positional control equipment for the control of interposing relays C and B which will in turn control lower deceleration and lower stop.

Lower now commences because solenoid valve SV26b is energised directly by Ry A. Solenoid valve 27a is energised by normally open contacts of Ry A which are now closed and through limit switch LS55 which is closed and the closed contacts of Ry C. Solenoid valve SV27b is energised by the contacts of Ry A, Ry B and LS56 being closed.

When lower commences limit switch LS85 opens and Ry14 becomes de-energised and through contacts 14–4 and 8–4 signal RT4 initiates tape. The information on the tape this time is for tables and move-car memories and assuming that during the following cycle all tables will be required and it is not required to move the car this information will consist of one pulse signal received on wire K344 and Ry56 becomes energised and through contacts 56–1 and 12–3 Ry56 is held in. During lower limit switch LS57 closes.

During lowering the movement is monitored by the positional equipment and when it is within a short distance of the required total movement a signal is received on wire K270 which is coming from the control supply on wire K139 and Ry C becomes energised and thus solenoid valve SV27a becomes de-energised by contacts of relay C. This hydraulically provides deceleration of the lower movement. When the lower movement is complete a signal is received from the positional equipment on wire K271 this coming again from the control supply on K139 and interposing Ry B becomes energised. This directly de-energises solenoid valve SV27b and the lower movement is hydraulically locked. This same signal received on wire K271 also energises Ry18 and through relay contacts 18–1 and 9–1 Ry18 is held in.

Through contacts 7–4, 18–2 and 8–5 solenoid valves SV24 and SV35 now becomes energised and creep slow commences. As it commences limit switch LS31 opens and Ry21 becomes de-energised. Simultaneously through contacts 18–4 becoming open solenoid valve SV23 becomes de-energised and tilt return occurs.

When the bricks contact the pack pressure switch PS1 becomes closed and through contacts 18–3 Ry7 is energised and through contacts 7–1 and 21–4 Ry7 is held in.

The next two operations occurring simultaneously are:
(1) Through relay contacts 7–2 solenoid valve SV25 becomes energised and low pressure air is applied to the vacuum hose and this effects the release of bricks onto the pack; and
(2) Through contacts 7–4 solenoid valve SV24 becomes de-energised and creep slow stops.

Pressurising the vacuum hose causes pressure switch PS2 to open and Ry20 de-energises. Opening of contacts 20–2 causes Ry8 and 9 to de-energise. Creep up now occurs because both solenoid valve SV24 and solenoid valve SV35 are de-energised by contacts 8–5 opening. Simultaneously with commencement of creep up contacts 8–6 become open and cause RY 6 to de-energise. Relay contacts 6–1 now open and RY A de-energises and the signal supply on wire K139 is removed.

De-energisation of Ry A causes solenoid valve SV26b to be de-energised and solenoid valve 27a to become energised through closed contacts of Ry A and the closed switch LS57. Lower return commences. Also through contacts 9–5, 59–4, 25–5 and 3–1 all being closed solenoid valve SV23 becomes energised and tilt occurs. Although contacts 8–2 are open Ry68 is held in by contacts 68–2 and 14–5.

When creep up is complete limit switch LS31 closes and Ry21 becomes energised. During creep up pressure switch PS1 opens and because relay contacts 21–4 are now open Ry7 de-energises and through contacts 7–2 solenoid valve SV25 de-energises and vacuum is again applied to the vacuum hose.

A short distance before lower return is complete limit switch LS57 opens and thus solenoid valve SV27a becomes de-energised and lower return continues hydraulically decelerated. A short distance before return is complete limit switch LS27 closes and Ry25 becomes energised. Now because contacts 25–5 and 9–2 are open solenoid valves SV3 and SV23 de-energise and twist and tilt return commence. When twist return commences limit switch LS2 opens.

Now because contacts 56–4, 25–4 and 9–3 are open and limit switch LS2 is open RY2, 3 and 4 de-energise. As relay contacts 4–6 close signal RT22 initiates tape. Also because contacts 3–4 open solenoid valves SV1 and SV2 become de-energised and split A and split B return commences.

As split A and split B return commences limit switches LS6 and LS7 become open and Ry73 becomes de-energised. Also as relay contact 2—2 becomes open Ry5 becomes de-energised and through contact 5–2 Ry D becomes de-energised and hence solenoid valve 28b becomes de-energised and solenoid 28a energised and rotate return commences.

As rotate return commence limit switch LS9 opens, LS218 opens and Ry69 de-energises and through contacts 69–1 becoming open Ry67 becomes de-energised.

When lower return is complete limit switch LS85 opens and Ry14 becomes energised.

The information on the tape may now be for either cross or travel return (depending on which is most convenient). Assuming this information is for travel return when the read in of information is complete, the information is converted electronically into suitable signals to cause the servo-hydraulics of the travel axis to return the carriage to the zero position, also a signal pulse will be received on wire K219 and through contacts 4–5 Ry13 is energised and through contacts 13–1 and 10–4 Ry13 is held in.

Opening of contacts 13–5 de-energises Ry12 and closing of contacts 12–5 gives signal RT23 which initiates tape. The information on the tape is then for cross return and when the read in of this information is complete, the information is converted electronically into suitable signals to cause the servo-hydraulics of the cross axis to return the carriage to the zero position, also a pulse signal is received on wire K345 and Ry16 becomes energised and through contacts 16–4 opening Ry15 becomes de-energised. Closing of contacts 16–1 being in series with closed contacts 56–3 gives signal RT24 and the next batch of information on the tape will be for rotate, twist, split A and split B memory relays. Assuming that it is not required to inhibit rotate, twist, split A or split B during the next cycle then the next signal received will be a pulse signal on wire K218 and Ry62 become energised and through contacts 62–1 and 12–4 which are closed Ry62 will hold in. When travel return and cross return movements are complete limit switch LS28 closes and Ry23 energises. Also limit switch LS29 closes and Ry24 energises.

It will be observed that further limit switches LS28a and LS29a which are wired normally closed are included in the circuit. Their function is such that should either travel or cross carriages over-run zero positions these switches open to break the circuits the tolerance of over-run being adjusted by means of cams operating the switches.

At the time of the pick-up of the bricks as already explained Ry9, 21 and 74 are energised. Relay contacts 9–6, 21–5 and 74–6 are open and thus Ry32 is de-energised. Through contacts 32–1, 2 and 3 supply is removed from solenoid valves SV7–22 inclusive and all the tables descend.

As tables 1–16 commence descent limit switches LS37–52 inclusive open and because during the movement of the travel carriage relay contacts 23–3 opened then Ry72 is de-energised.

When all the tables are fully down limit switches LS58–73 inclusive are closed and Ry33 is energised. Because relay contacts 33–4 and 33–5 are now open Ry11 and 30 are de-energised. Because relay contacts 30–3 and 11–3 are now open Ry29 is de-energised and because of relay contacts 29–1 solenoid valve SV5 is de-energised and the tables close. When the tables are closed limit switch LS30 is opened and Ry19 is de-energised and now because relay contacts 10–5 and/or 11–4 and 30–4 are closed, solenoid valve SV4 is energised and guides up movement commences.

When guides up movement is complete limit switch LS32 is closed and Ry22 energised and through contacts 22–3 Ry64 will energise. Assuming that bricks have been delivered to the feed conveyor limit switches LS76–81 inclusive will close and because relay contacts 11–5, 19–4, 22–1 and 30–5, 19–6, 22–2 are closed both Ry1 and Ry31 are energised. To prevent intermittent operation of either Ry1 or Ry31 due to bricks opening and closing any of switches LS76–81 inclusive a hold in line is provided in parallel with these switches through relay contacts 1–2 and 31–2.

Through the relay contacts 1–1 and 31–1 solenoid valves 29 and 30 are energised and lamps A and B off occurs. As clamps A and B come off limit switches LS54 and LS54a close and solenoid valves SV31 and 32 are energized. Now pneumatic drive is applied to the conveyor and bricks are moved onto the pickup tables.

When the pick-up tables are completely supplied with bricks limit switches LS11—26 inclusive close and Ry11 and 30 are energised. Because contacts 11–5 and 30–5 are now open Ry1 and 31 are now de-energised and thus solenoid valves SV29 and 30 are de-energised and both clamps A and B come on. When clamps A and B are on one side of limit switch LS54 and 54a opens and solenoid valves SV31 and 32 are de-energised and hence pneumatic drive of bricks to the pick-up station is removed. Simultaneously with the clamps being applied because contacts 11–4 and 30–4 are now open solenoid valve SV4 is de-energised and guides down commences. When the guides down is complete limit switch LS32 is opened and Ry22 de-energised. Because the clamps are now on, the other side of limit switches LS54 and 54a will now close and through relay contacts 30–3, 11–3 and 22–4 being closed Ry29 will energise and through contacts 29–1 solenoid valve SV5 will energise and tables open commence. When tables open is complete, limit switch LS30 will close and Ry19 energise and now because relay contacts 64–6, 19–1, 9–6 and 56–2 are closed, Ry32 is energised and through contacts 32–1, 2 and 3 solenoid valves SV7–22 inclusive are energised and tables up commences. As tables up commences limit switches LS58–73 inclusive are opened and Ry33 de-energised. Because contacts 22–3 and 33–1 are now open Ry64 is de-energised.

When all tables are up limit switches LS37–52 inclusive are closed Ry72 is energised and through contacts 72–1, 20–3 and 23–3 being closed a hold in supply for Ry72 is provided.

Table Memories (Panels 8 and 10)

If after initiate tape signal RT4 a combination of tables other than the full 16 is required then this is achieved by inhibiting any table not required by opening a pair of relay contacts in the circuit between Ry32 and the appropriate solenoid valve. This is achieved as follows:

To inhibit table No. 1 appropriate holes are punched on the tape to energise GPS relay No. 1 and this gives a pulse signal on wire K206 which through relay contacts 49–4 and 41–4 energises Ry35 and Ry35 is held in through contacts 35–1 and/or 2–4 and 12–3. Thus it can be seen that contacts 35–4 are open and solenoid valve SV7 cannot be energised and table 1 does not come up. Also when Ry35 is energised through contacts 35–2 initiate tape signal RT5 is given and the next piece of table information will be read. If table 2 is not required then the next information on the tape will energise GPS relay No. 2 and this will give a pulse signal which through relay contacts 49–5 and 41–5 will energise Ry36 and through contacts 36–1 and/or 2–4 and 12–3 will be held in and now because contacts 36–4 are open solenoid valve SV8 cannot be energised and thus table 2 cannot come up. Through relay contacts 36–2 initiate tape signal RT6 is given up for the next batch of table information on the tape and so on for tables 3, 4, 5 and 6 through GPS relays 3, 4, 5 and 13. If any of the tables 7, 8, 9, 10, 11 or 12 are not required then the information on the tape must first energise GPS relay No. 6 which through a pulse signal will energise Ry40 and through contacts 40–1 and/or 2–4 and 12–3 Ry40 will be held in and through contacts 40–2 Ry41 and 42 will be energised. Through relay contacts 40–3 initiate tape signal RT10 is given for the next batch of information on the tape.

Now by programming on the tape GP relays 1 or 2 or 3 or 4 or 5 or 13 Ry43 or 44 or 45 or 46 or 47 or 66 may be energised and thus prevent solenoid valves SV13 or 14 or 15 or 16 or 17 or 18 from being energised, i.e., tables 7, 8, 9, 10, 11 or 12 cannot come up. If tables 13, 14, 15 or 16 are not required then the information on the tape must first energise GPS relay 7 which through a pulse signal will energise Ry48 and through relay contacts 48–1 and/or 2–4 and 12–3 Ry48 will be held in. Through contacts 48–2 Ry49 and 50 are energised and through contacts 50–3 initiate tape signal RT16 is given for the next batch of tape information. Now by programming on the tape GPS relays 1, 2, 3 or 4 Ry51, 52, 53 or 54 may be energised and prevent solenoid valves SV19, 20, 21 or 22 being energised and thus prevent tables 13, 14, 15 or 16 from coming up. If the cycle the machine is performing is the last of a brick pack then in addition to GPS relay 7 being programmed on the punch tape (this is not necessary if GPS relay 7 has been energised in order to inhibit table No. 13, 14, 15 or 16) GPS relay No. 5 must now be programmed on the tape and with a pulse signal to relay contacts 50–2 Ry55 will be energised and through relay contacts 55–1 and the normally closed change-over contacts of Ry26, Ry55 will be held in. Through relay contacts 55–2 initiate tape signal RT21 is given and the final signal for all table and move-car memories would then be programmed by energising GPS relay 14 which gives a pulse signal on wire K344 and energises Ry56 previously described.

*Rotate memories.*—If after initiate tape signal RT24 it is desired to inhibit rotate, twist, tilt, split A or split B this is achieved by opening a pair of relay contacts as described below:

(1) No rotate—

The appropriate holes are punched on the tape to energise GPS relay 8 and a pulse signal received on wire K214 energises Ry57 and through contacts 57–1 and/or 2–1 and 12–4 Ry57 is held in. Now because contacts 57–4 are held open Ry5 cannot be energised and thus Ry D cannot be energised and solenoid valve SV28b remains de-energised and solenoid valve SV28a energised. It can be seen from the circuitry (panel 17a) that as the machine is not now rotating limit switch LS9 will not close but the circuit will be completed by contacts 57–3 which are in parallel with limit switch LS9. Through contacts 57–2 Ry58 is energised. Through contacts 58–2 a circuit in parallel with contacts 63–4 can be completed to give initiate tape signal RT2. This circuit is actually completed when after part travel limit switch LS82 closes. Through contact 58–1 initiate tape signal RT25 is given for the next batch of information required from the tape.

(2) No twist and tilt, no split A and no split B—

These movements may be inhibited by the appropriate punched holes on the tape to energise GPS relays 9, 10 and 11 which through pulse signals on wires K215, 216 and 217 will energise Ry59, 60 and 61. These relays are provided with a hold in circuit and by contacts 59–4 being open solenoid valves SV3 cannot be energised and so twist and tilt do not occur. By contacts 60–4 being open solenoid valve SV1 cannot be energised and so split A does not occur and by relay contacts 61–4 being open solenoid valve SV2 cannot be energised and thus split B does not occur.

It can be seen that Ry59, 60 and 61 are each provided with a pair of contacts which if the relays are energized will close and provide circuits in parallel with limit switches LS8, LS6 and LS7.

If it is desired to stop the machine at the end of a cycle and Ry55 has been energised as described on the table memories when Ry25 is energised after table information has been read from the tape then through contacts 55–3 and 25–2 Ry27 will be energised and through contacts 27–1 Ry E is energised. From this relay signals may be taken to initiate any action required external to the setting unit for the removal of a pack of bricks. Limit switch LS53 is provided to sense that a kiln-car is in position or that a setting table is ready to receive bricks. When the kiln-car commences to move or the brick pack is removed from the table limit switch LS53 closed and Ry26 becomes energised. The operation of the change-over contacts of Ry26 now de-energises Ry55 and provides a hold in supply for Ry27 and through contacts 26–1 closing in parallel with contacts 27–6 the machine can continue to pick up bricks and carry out all its functions in a horizontal plane with the exception of initiating tape signal RT3. When the next empty kiln-car is correctly positioned or the setting table is ready to receive bricks then limit switch LS53 will open and deenergise Ry26 and thus Ry27 will be de-energised and by closing contacts 27–5 initiate tape signal RT3 can be given and the machine continue automatically.

*Starting procedure.*—To initiate automatic control of the setting unit when all supply services are available (i.e., A.C., D.C., vacuum, compressed air and hydraulics), switch H26 is closed and assuming that all the safety circuits external to the automatic control of the machine are made and also that the GPS positional equipment switches are in the auto-position for servo-control and the tape input switch to inhibit then relay contacts H1–4 will be closed. The sequence of operation is as follows:

(1) The punched tape is set to read table information for cycle No. 1 of the brick pack which is programmed during the last cycle of the previous pack.

(2) The D.C. Auto hand switch 1a is set to the auto-position.

(3) The start-run hand switch 1b is operated. This energises Ry28 which will be held in by contact 28–1. Through contacts 28–2 Ry CB is energised and through this relay the main auto D.C. negatives SR2, 3 and 4 are made available.

(4) With the hand switch 2 in the test position the hand switch 4 is operated and this initiates tape and operation of the hand switch 4 is repeated until lamps 3 and 4 are both on thus indicating that the table and rotate memory information is complete, during the reading of the tape information relative to travel, cross and lower is ignored because of the position of the tape input switch being position to inhibit.

(5) Tape input switch is operated to "Read."

(6) The hand switch 2 is operated from test to auto and assuming that all other conditions are correct as described above R$y$10 will be energised and the next cycle commence.

*Hydraulic and Positional control equipment*

Reference will now be made to FIGURE 37 which illustrates wholly schematically the positional control equipment. All the components illustrated thereon are well known in themseves and accordingly no detailed description of them is given. Reference will also be made to FIGURE 38 which is essentially a circuit diagram of the hydraulic system.

The hydraulic equipment on the machine consists of the following sections.

(1) The Power Supply (38/A)
(2) The Safety Valve Circuit
(3) The X Axis Control (38/B)
(4) The Y Axis Control (38/C)
(5) The Axis Control (38/D)
(6) The Rotate Mechanism (38/E)

(1) *Power Supply.*—Hydraulic power is supplied by a pump 801 driven by an electric motor 802 and an accumulator 803. Maximum system pressure is governed by a relief valve HV1 and oil returning to the tank is filtered by filters 804 and 805 and cooled in cooler 806.

(2) *Safety valve circuit.*—The entire circuit is made "safe" by de-energising both solenoid valves SV33 and SV34 and stopping the electric motor 802. De-energising SV33 removes pilot pressure from HV17 which allows stored energy in the accumulator 803 to be returned to the reservoir 807 of the power pack via valves HV38 and HV17. Also in de-energising SV33 pilot pressure is removed from HV35, HV24 and HV22 and this has the effect of closing the hydraulic circuit between the X-axis servo-valves 808 and 809 and the motor 810. The effect of closing this circuit is such that the momentum of the travel carriage now tries to drive the motor 810 and dynamic braking is effected across valves HV12 or HV13 depending upon the direction of movement of the carriage and because of the pressure setting of these valves the system is brought to rest.

Removal of the pilot pressure from valve HV22 removes pressure supply from solenoid valve SV28 and dependent upon whether 8$a$ or $b$ of SV28 is energised the pilot pressure will be removed either from HV20 or HV21 and this applies dynamic braking to the rotate movement through the oil being exhausted from either cylinder 811 or 812 and the system comes to rest. De-energisation of SV34 will remove pilot pressure to valves HV18 and HV19 and the hydraulic circuit now between these two valves and the motor 813 is locked and the system containing valves 814, HV11 and HV10 will now bring to rest the cross carriage movement in a similar manner to that described for the X axis.

The sequence in which information is taken from the tape is of course entirely dependent upon the sequence in which the tape is punched. Thus movement along the X, Y and Z axes occurs as a result of the tape being initiated by the automatic relay circuit. For movements along the X, Y and Z axes the positional information is prefixed by a code which directs the information to the appropriate register for X, Y or Z.

(3 and 4) *X and Y axis control.*—The lines of punched holes following the code for X or Y represent a number which is related to the direction and the total amount of movement required. The whole of this number is passed to the coarse register and if the number is not an exact multiple of 8 the excess over any multiple of 8 is fed into the fine position register and then converted into analogue electrical signals and, through a servo-electronic amplifier, causes full deflection of the servo valves 808 and 809 for the X-axis on 814 for the Y-axis torque motors thus fully opening the servo-pilot valves which in turn fully open the main servo-valves ports and apply full drive by means of the motors 810 for the X-axis or 813 for the Y axis and through these motors being mechanically geared to the ball lead screws, the carriages are driven.

The ball lead screws driving the carriages carry counting discs which have castellated circumferences which interrupt beams of light between projectors and receivers. These interruptions feed signal pulses to a digital position feed back register which converts them to an analogue and this analogue voltage is continuously compared with and substracted from the demanded analogue voltage until the resulting error reaches a certain value when the signal from the servo-electronic amplifier tends to close the servo-valve and thus produces a deceleration of the carriages.

When the positional error is reduced to less than 2″ then a coarse/fine change-over switch is operated and now the machine position is controlled by comparison of resolver synchros and the analogues on the fine position registers.

The resolver synchros are driven by the machine through gearing such that they make one complete revolution for every 8″ of carriage movement. Thus at the time of switching from coarse to fine the signal error between the fine position analogue and the resolver synchro will be within 2″ of a true null and now the voltage supply to the torque motors on the servo-valves and hence the position of the main spools is determined by the error between two synchros, one located on the relevant axis of the machine and driven by the machine and the other located within the positional control panel. As the error between the two synchros decreases so the signal to the servo valve torque motor will decrease until the error between the two synchros is zero when the ports of the servo valve are closed and the carriage is at rest.

During normal acceleration and deceleration of the X and Y carriages valves HV12 and HV13 for the X-axis and HV10 and HV11 for the Y-axis provide a means for limiting the acceleration or deceleration by adjustment of the pressure setting of the valves.

(5) *Z axis control.*—The lines following the code for the Z axis represent a number related to the amount of movement required. This information does not require any sense of direction as the Z-axis is positionally controlled in one direction only, namely lower. When this read-in of information is complete as described in the relay description the hydraulic valves SV26$b$, 27$a$ and 27$b$ are energized. With the valves in this condition cylinder 815 will extend by the action of gravity and the oil exhausted from the cylinder via valve HV27 and SV26$b$ which has ports A and T connected and thence through HV15 which has been arranged for a limited opening thus controlling the maximum down speed. When the register has counted down to a number representing 12″ away from the demanded position a signal is produced which as described in the relay circuit de-energises hydraulic valve SV27$a$.

This de-energising closes vent connection to relief valve HV15 which provides braking action on the down movement of the cylinder. When relief valve HV15 is shut the cylinder is moving down at slow speed controlled by needle valve HV43. As described in the relay circuit description when the lower is complete valve SV27$b$ is de-energised. De-energisation of valve SV27$b$ removes pilot pressure from valve HV27 and HV28 after a short time delay governed by valve HV42. The final inertia of the system is destroyed across relief valve HV14 and when the system is at rest valve HV28 will close thus holding the piston and its load stationary.

As described in the relay circuitry the return of the lower movement is initiated by de-energisation of Ry A and this in turn causes valve SV26b to de-energise and valve 27a to energise. Oil is fed to the annulus of the cylinder 815 via pressure reducing valve HV35, valve HV27, valve HV23, valve HV39, valve SV26b which has ports P and A connected and valve HV27. Valve HV35 limits the pressure supplied for this operation to 1000 p.s.i. and pressure reducing valve HV23 is piloted open by valve SV27a the upward speed being controlled by valve HV37 and valve HV39. As described in the relay circuitry, a short distance before lower return is complete LS57 opens and valve SV27a is de-energized. De-energization of valve SV27a permits pressure reducing valve HV23 to function normally as a pressure reducer and cylinder 815 will decelerate under gravity and because of reduced pressure (100 p.s.i.) being supplied through pressure reducing valve HV23. Final homing is achieved by oil being supplied via adjustable orifice H39 and the final stop being mechanical.

Valves HV16 and HV33 eradicate pilot pressure surge to valve HV27 when valve SV26b is de-energised for the lower return movement thus preventing a momentary lower movement.

(6) *Rotate control*.—Pressure supply to this system is controlled to 1000 p.s.i. maximum by valve HV47 through valve HV22 and when solenoid a of valve SV28 is energised pressure is connected to port A and then through valve HV21 pressure will be applied to the single acting cylinder 812 and thus the piston of cylinder 812 will be extended and the piston of cylinder 811 retracted. The oil exhausted from cylinder 811 through valve HV20 and ports B to T of valve SV28 thus providing a free flow return to tank 807. When the piston of cylinder 811 reaches a predetermined point a control notch on the piston of cylinder 811 progressively limits the outflow of oil thus providing the necessary braking to reduce speed to a minimum before motion is arrested completely by mechanical stop. The extension of the piston of cylinder 812 and retraction of the piston of cylinder 811 through mechanical linkage hereinbefore described causes rotation.

To rotate return solenoid a of valve SV28 is de-energised and solenoid b energised as described. With the solenoids in this condition ports P to B and T to A of valve SV28 will be connected and the reverse procedure to that described for rotate will occur. Movement on the Z axis is continuously monitored by a counting disc similar to that for the X and Y axis and the number in the Z axis register counted down to zero.

This application is a continuation-in-part of my application Serial No. 103,862 the disclosure of which is herein made a part of the disclosure of the present application.

What I claim is:

1. Apparatus for mechanically handling articles comprising, carrier means for the acquisition, conveyance and release of a predetermined number of articles, means supporting said carrier means for displacement in at least three diverse directions, driving means for displacing said carrier means in the aforesaid directions to predeterminable extents, assembly means for conveying said articles to a pickup point convenient to said carrier means including selection means for presenting at said pickup point a selectively predetermined number of articles for acquisition and conveyance by said carrier means to the exclusion of other articles at said pickup points, said carrier means including head means and means for effecting movement of said head means with respect to said structural means, and operations control means for selectively effecting control of said driving means and said means effecting movement of said head means including means for selecting the number of articles presented at said pickup point for acquisition, said assembly means including a plurality of individual support means in number corresponding to the maximum number of articles capable of being conveyed by said carrier means at a given time, said selection means being connected to each support means to selectively displace a number of said support means in response to control from said operations control means in a direction toward said head means at said pickup point, said assembly means further including guide means for ensuring correct disposition of said articles on said support means and means for slightly separating said support means from each other prior to acquisition of said articles by said carrier means.

2. Apparatus for mechanically handling articles comprising, carrier means for the acquisition, conveyance, and release of a predetermined number of articles, means supporting said carrier means for displacement in at least three diverse directions, driving means for displacing said carrier means in the aforesaid directions to predeterminable extents, assembly means for conveying said articles to a pickup point convenient to said carrier means including selection means for presenting at said pickup point a selectively predetermined number of articles for acquisition and conveyance by said carrier means to the exclusion of other articles at said pickup point, said carrier means including head means and means for effecting movement of said head means with respect to said structural means and operations control means for selectively effecting control of said driving means and said means effecting movement of said head means including means for selecting the number of articles presented at said pickup point for acquisition, said assembly means including a plurality of individual support means in number corresponding to the maximum number of articles capable of being conveyed by said carrier means at a given time, said selection means being connected to each support means to selectively displace a number of said support means in response to control from said operations control means in a direction toward said head means at said pickup point, and said assembly means further including conveyor means collecting articles for discharge to said assembly means, said conveyer means including a first main part having a plurality of individually drivable sections and means for progressively reducing the drive to said conveyer means with increase in the number of articles placed upon said first main part.

3. Apparatus for mechanically handling articles comprising carrier means for the acquisition, conveyance, and release of a predetermined number of articles, means supporting said carrier means for displacement in at least three diverse directions, driving means for displacing said carrier means in the aforesaid directions to predeterminable extents, assembly means for conveying said articles to a pickup point convenient to said carrier means including selection means for presenting at said pickup point a selectively predetermined number of articles for acquisition and conveyance by said carrier means to the exclusion of other articles at said pickup point, said carrier means including head means and means for effecting movement of said head means with respect to said structural means and operations control means for selectively effecting control of said driving means and said means effecting movement of said head means including means for selecting the number of articles presented at said pickup point for acquisition, said assembly means including a plurality of individual support means in number corresponding to the maximum number of articles capable of being conveyed by said carrier means at a given time, said selection means being connected to each support means to selectively displace the number of said support means in response to control from said operations control means in a direction toward said head means at said pickup point, and said assembly means further including conveyer means collecting articles for discharge to said assembly means, said conveyer means including a first main part having a plurality of individually driveable sections and means for progressively reducing the drive to said conveyer means with increase in the number of articles placed upon said first main part, said conveyer means including a second main part having a plurality of individually driveable sections adjacent the support means receiving articles from said first main part for accumulating and driving said articles to said support means to fill selected support means.

4. Apparatus for mechanically handling articles comprising carrier means for the acquisition, conveyance, and release of a predetermined number of articles, means supporting said carrier means for displacement in at least three diverse directions, driving means for displacing said carrier means in the aforesaid directions to predeterminable extents, assembly means for conveying said articles to a pickup point convenient to said carrier means including selection means for presenting at said pickup point a selectively predetermined number of articles for acquisition and conveyance by said carrier means to the exclusion of other articles at said pickup point, said carrier means including head means and means for effecting movement of said head means with respect to said structural means and operations control means for selectively effecting control of said driving means and said means effecting movement of said head means including means for selecting the number of articles presented at said pickup point for acquisition, said assembly means including a plurality of individual support means in number corresponding to the maximum number of articles capable of being conveyed by said carrier means at a given time, said selection means being connected to each support means to selectively displace the number of said support means in response to control from said operations control means in a direction toward said head means at said pickup point, and said assembly means further including conveyer means collecting articles for discharge to said assembly means, said conveyer means including a first main part having a plurality of individually driveable sections and means for progressively reducing the drive to said conveyer means with increase in the number of articles placed upon said first main part, said conveyer means including a second main part having a plurality of individually driveable sections adjacent the support means receiving articles from said first main part for accumulating and driving said articles to said support means to fill selected support means, and said conveyer means further including clamping means for holding the articles on said second main part during acquisition by said carrier means of articles on said support means.

5. Apparatus for mechanically handling articles comprising, carrier means for the acquisition, conveyance and release of a predetermined number of articles, means supporting said carrier means for displacement in a plurality of diverse directions, driving means for displacing said carrier means in the aforesaid directions to predeterminable extents, assembly means for conveying said articles to a pickup point convenient to said carrier means including selection means for presenting at said pickup point a selectively predetermined number of articles for acquisition and conveyance by said carrier means to the exclusion of other articles at said pickup points, said carrier means including head means and means for effecting movement of said head means with respect to said structural means, and operations control means for selectively effecting control of said driving means and said means effecting movement of said head means including means for selecting the number of articles presented at said pickup point for acquisition, said assembly means including a plurality of individual support means in number corresponding to the maximum number of articles capable of being conveyed by said carrier means at a given time, means for displacing said support means in a direction toward said head means at said pickup point for permitting selective engagement of the articles by the head means, said assembly means further including guide means for ensuring correct disposition of said articles on said support means and means for slightly separating said support means from each other prior to acquisition of said articles by said carrier means.

References Cited by the Examiner

UNITED STATES PATENTS

| | | |
|---|---|---|
| 1,222,535 | 1/1917 | Crum. |
| 2,822,094 | 2/1958 | Greer. |
| 2,858,009 | 10/1958 | Bainbridge. |
| 2,980,264 | 4/1961 | Burt _____ 212—132 |
| 2,980,265 | 4/1961 | Johnson. |
| 3,007,097 | 10/1961 | Shelley et al. |
| 3,033,059 | 5/1962 | Melton et al. |
| 3,071,262 | 1/1963 | Bosch _____ 214—11 X |
| 3,090,502 | 5/1963 | Gunzelmann _____ 214—658 X |

GERALD M. FORLENZA, *Primary Examiner.*

HUGO O. SCHULZ, *Examiner.*

M. WOLSON, M. TEMIN, J. E. OLDS,
*Assistant Examiners.*